United States Patent
Onawa

(10) Patent No.: US 9,588,295 B2
(45) Date of Patent: Mar. 7, 2017

(54) DIRECTIONAL COUPLER AND DESIGN METHOD THEREOF, OPTICAL WAVEGUIDE ELEMENT AND WAVELENGTH FILTER

(71) Applicant: Oki Electric Industry Co., Ltd., Tokyo (JP)

(72) Inventor: Yosuke Onawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/742,256

(22) Filed: Jun. 17, 2015

(65) Prior Publication Data

US 2016/0025928 A1 Jan. 28, 2016

(30) Foreign Application Priority Data

Jul. 22, 2014 (JP) .................................. 2014-149119

(51) Int. Cl.

| G02B 6/14 | (2006.01) |
| G02B 6/125 | (2006.01) |
| G02B 6/12 | (2006.01) |
| G02B 6/122 | (2006.01) |
| G02B 6/124 | (2006.01) |

(52) U.S. Cl.
CPC .............. *G02B 6/14* (2013.01); *G02B 6/125* (2013.01); *G02B 6/12007* (2013.01); *G02B 6/1228* (2013.01); *G02B 6/124* (2013.01)

(58) Field of Classification Search
CPC ......... G02B 6/1228; G02B 6/105; G02B 6/14
USPC .......................................................... 385/42
See application file for complete search history.

(56) References Cited

U.S. PATENT DOCUMENTS 7,373,042 B2 * 5/2008 Little ..................... G02B 6/126
385/11
2011/0076025 A1 3/2011 Shimura

FOREIGN PATENT DOCUMENTS

JP 2011-077133 A 4/2011

OTHER PUBLICATIONS

Tai Tsuchizawa et al., "Microphotonics Devices Based on Silicon Microfabrication Technology", vol. 11, No. 1, Jan./Feb. 2005.
Hirohito Yamada et al., "Si Photonic Wire Waveguide Devices", vol. 12, No. 6, Nov./Dec. 2006.

* cited by examiner

Primary Examiner — Ryan Lepisto
(74) Attorney, Agent, or Firm — Rabin & Berdo, P.C.

(57) ABSTRACT

There is provided a directional coupler including a first optical waveguide core and a second optical waveguide core that are arranged in separate and parallel to each other and that propagate one of TE polarized waves and TM polarized waves of an m-th order and propagate the other of the TE polarized waves and the TM polarized waves of an n-th order. A separation distance between the first optical waveguide core and the second optical waveguide core and a width of the first optical waveguide core and the second optical waveguide core are set such that a mode coupling coefficient of a p-th mode of one of the polarized waves and a mode coupling coefficient of a q-th mode of the other polarized waves match between the first optical waveguide core and the second optical waveguide core.

4 Claims, 10 Drawing Sheets

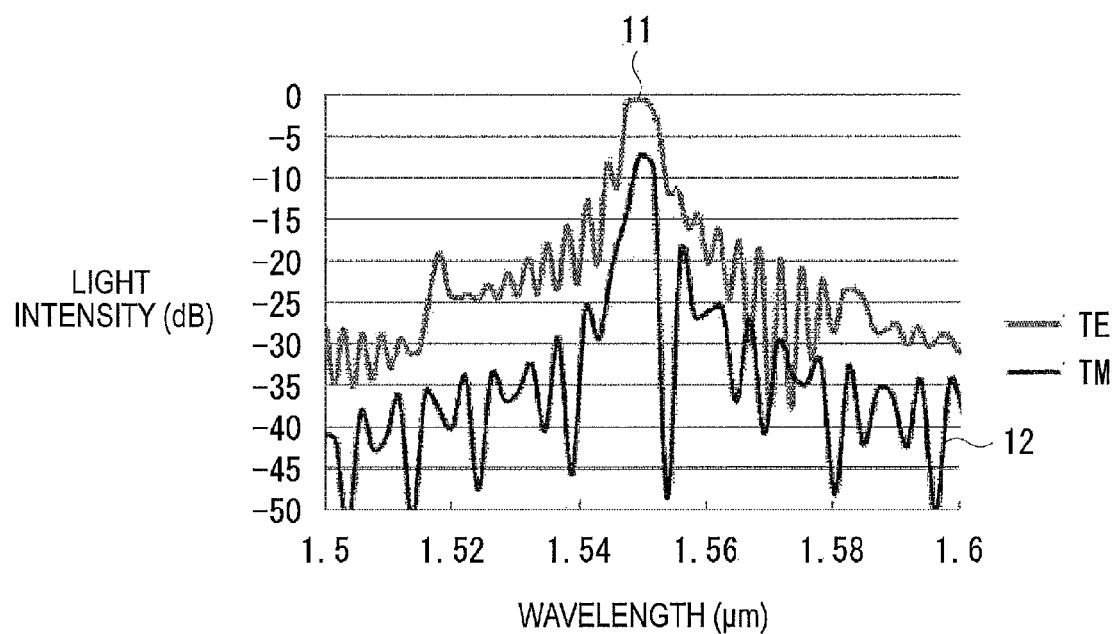

DIRECTIONAL COUPLER AND DESIGN METHOD THEREOF, OPTICAL WAVEGUIDE ELEMENT AND WAVELENGTH FILTER

CROSS REFERENCE TO RELATED APPLICATION(S)

This application is based upon and claims benefit of priority from Japanese Patent Application No. 2014-149119, filed on Jul. 22, 2014, the entire contents of which are incorporated herein by reference.

BACKGROUND

The present invention relates to a directional coupler that can be used in a polarization-independent manner and to a design method thereof, an optical waveguide element and a wavelength filter.

In an information processing device that requires high speed signal processing, electrical wiring bandwidth limitations cause bottlenecks. As a result, with an increase in the amount of information transmission, optical cable technology is attracting attention. In optical cable technology, optical devices are used that use optical fiber and optical waveguide elements as a transmission medium, and the transmission of information between elements, between boards and between chips, inside the information processing device is performed using optical signals.

An optical device is configured to be provided with optical elements, such as an optical transmitter, an optical receiver and the like. These optical elements can be spatially coupled together using a lens, for example, after performing complex optical axis alignment in order to align central positions (a light receiving position or a light emission position) of each of the optical elements with design positions.

Here, as means to couple each of the optical elements, technology exists in which an optical waveguide element is used in place of the lens (refer to Japanese Laid-Open Patent Publication No. 2011-77133, for example). When using the optical waveguide element, light is confined and propagated inside an optical waveguide and thus, in contrast to the case in which the lens is used, it is not necessary to perform the complex optical axis alignment. As a result, an assembly process of the optical device becomes simple and is suitable for mass production.

In particular, in an optical waveguide element that uses silicon (Si), which is the same material as that of a substrate of an electronic function circuit, as a waveguide material, it is anticipated that photoelectric fusion (silicon photonics), in which the electronic function circuit and an optical function circuit are collectively formed, will be realized. (refer to IEEE Journal of Selected Topics in Quantum Electronics, vol. 11, 2005, p.232-240 and IEEE Journal of Selected Topics in Quantum Electronics, vol. 12, No. 6, November/December 2006, p.1371-1379, for example). In silicon photonics, at a time of manufacture, it is possible to use semiconductor manufacturing technology, which is a mature technology.

As a structure of the optical waveguide element, there is an Si wire waveguide, for example. In the Si wire waveguide, an optical waveguide core that is the actual transmission path of the light is formed using Si as a material. Then, a periphery of the optical waveguide core is covered with a cladding made of silicon oxide ($SiO_2$) or the like, for example, which has a lower refractive index than Si. With this type of structure, as there is an extremely large difference in the refractive index between the optical waveguide core and the cladding, it is possible to strongly confine the light inside the optical waveguide core. As a result, it is possible to realize a compact curved waveguide in which a radius of curvature is around several nm, for example. Thus, it is possible to create an optical circuit having a similar size to the electronic circuit, which is advantageous in making the optical device as a whole more compact.

Further, if a silicon on insulator (SOI) substrate is used for the Si wire waveguide, it is possible to easily manufacture. First, the SOI substrate is prepared which is formed by sequentially laminating a support substrate layer, an $SiO_2$ layer and an Si layer (SOI layer). Next, the optical waveguide core is formed by patterning the SOI substrate. Then, the optical waveguide core is covered by an $SiO_2$ layer. In this manner, the Si wire waveguide can be obtained in which the optical waveguide core is covered by the $SiO_2$ layer as a cladding.

When the optical device is used in a communication system that uses wavelength multiplexing technology, such as a passive optical network (PON) etc., it is necessary to have an element that switches a path of an optical signal for each wavelength. In order to realize this, there is a structure that uses an optical waveguide element which has been imparted a function as a wavelength filter.

The wavelength filter that uses the optical waveguide element is, for example, a Mach-Zehnder wavelength filter. As a coupler of the Mach-Zehnder wavelength filter, a directional coupler that is formed of the Si wire waveguide is used.

Here, characteristics of the Si wire waveguide differ depending on the polarization. Therefore, a disadvantage of the directional coupler using the Si wire waveguide is that polarization dependence occurs. As a method to resolve the polarization dependence, it is conceivable to adjust a separation distance between a pair of the optical waveguide cores that form the directional coupler, along with adjusting a thickness and a width of the optical waveguide cores.

SUMMARY

The thickness of the optical waveguide core depends on a thickness of an SOI layer of the SOI substrate used in manufacture. Therefore, to resolve the polarization dependence of the directional coupler, parameters that can be changed as desired are only the separation distance between the pair of optical waveguide cores and the width of the optical waveguide cores. Then, when only changing these two parameters, there are cases in which it is not possible to attain conditions required to resolve the polarization dependence.

Thus, in order to reliably resolve the polarization dependence, it is preferable to also adjust the thickness of the optical waveguide core. However, as described above, as the thickness of the optical waveguide core depends on the thickness of the SOI layer, there are limitations on the SOI substrate that can be used.

Meanwhile, in an optical device that uses the optical waveguide element, there are cases in which optical elements other than a wavelength filter of a spot size converter or modulator etc. are formed as a batch using the same SOI substrate. In order to determine an optimum optical waveguide core thickness for each of these optical elements, it is preferable that the thickness of the SOI layer can be selected in a flexible manner. Thus, it is not desirable that there be limitations on the SOI substrate that can be used.

Here, it is an object of the present invention to provide a directional coupler that can be used in a polarization-independent manner and that offers a high level of freedom of design with respect to a thickness of an optical waveguide core compared to known art and a design method thereof, an optical waveguide element and a wavelength filter.

In order to resolve the above-described problems, a directional coupler according to the present invention is provided with the following features.

The directional coupler according to the present invention is configured to be provided with a first optical waveguide core and a second optical waveguide core that are arranged in parallel with each other.

The first optical waveguide core and the second optical waveguide core propagate either transverse electric (TE) polarized waves or transverse magnetic (TM) polarized waves of an m-th order (m is in integer of 1 or more) and propagate the orthogonal polarized waves of an n-th order (n is an integer of 0 or more).

A separation distance between the first optical waveguide core and the second optical waveguide core and a width of the first optical waveguide core and the second optical waveguide core are set such that a mode coupling coefficient of a p-th mode of one of the polarized waves (p is an integer satisfying $0 \leq p \leq m$) and a mode coupling coefficient of a q-th mode of the other polarized waves (q is an integer satisfying $0 \leq q \leq n$) match between the first optical waveguide core and the second optical waveguide core.

In the directional coupler of the present invention, the first optical waveguide core and the second optical waveguide core are able to propagate a plurality of order modes of at least one of the polarized waves. In this way, it is possible to expand the order mode selectivity of each of the polarized waves that are coupled between the first optical waveguide core and the second optical waveguide core. As a result, it is possible to expand the selectivity of the mode coupling coefficient that causes the matching in each of the polarizations. Then, at the design stage, it is possible to freely select the mode coupling coefficient that causes the matching in each of the polarizations. Therefore, when using the directional coupler in a polarization-independent manner, there is a greater freedom of design with respect to the thickness of the optical waveguide core.

BRIEF DESCRIPTION OF THE DRAWINGS

FIG. 11 is a diagram evaluating characteristics of a grating.

DETAILED DESCRIPTION OF THE EMBODIMENT(S)

Hereinafter, referring to the appended drawings, preferred embodiments of the present invention will be described. It should be noted that a shape, size and arrangement relationship of each of the structural elements are merely shown schematically to an extent at which the present invention can be understood. Further, hereinafter, preferred configuration examples of the present invention are explained, but a material and conditions described using numerical values etc. of each of the structural elements are merely preferred examples. Thus, the present invention is not limited to the preferred embodiments below, and various changes or modifications that can achieve the effects of the present invention may be applied without departing from the spirit and scope of the present invention.

(Directional coupler)

Figure 1A:
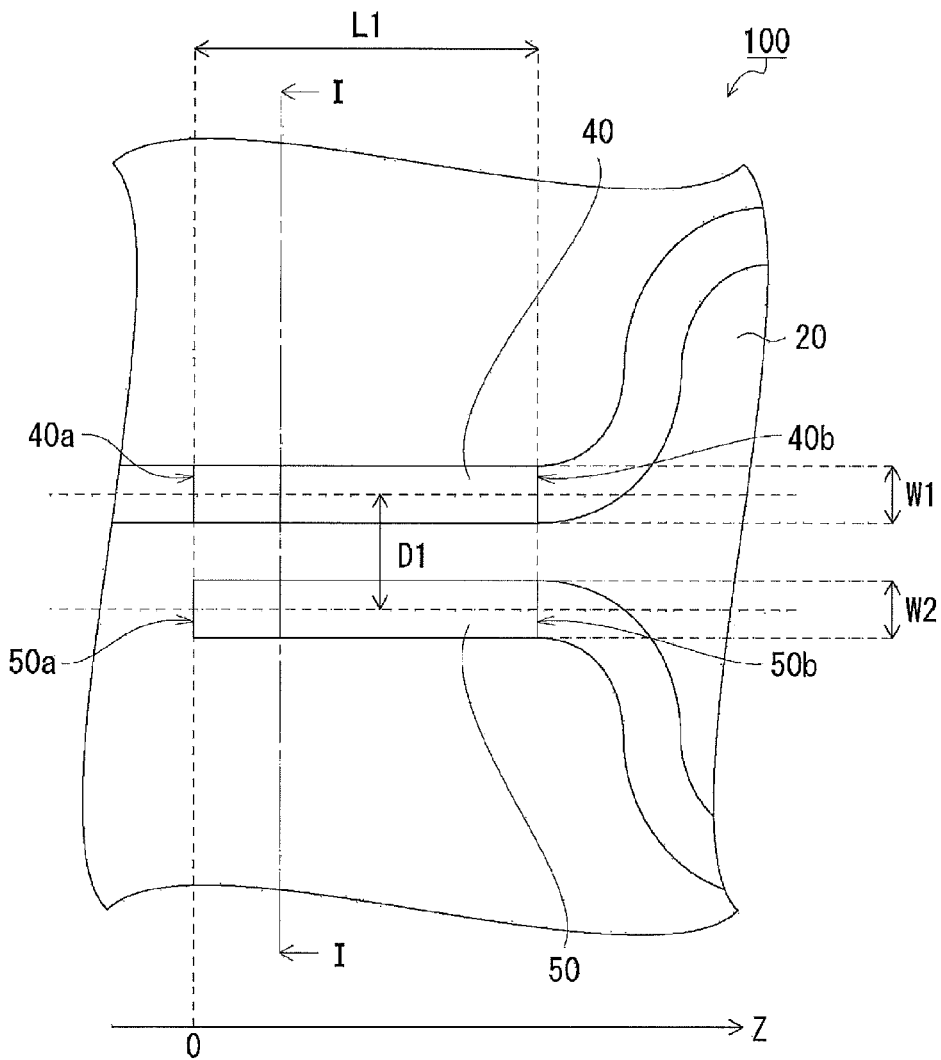
FIG. 1A is a schematic plan view showing a directional coupler.
Figure 1B:
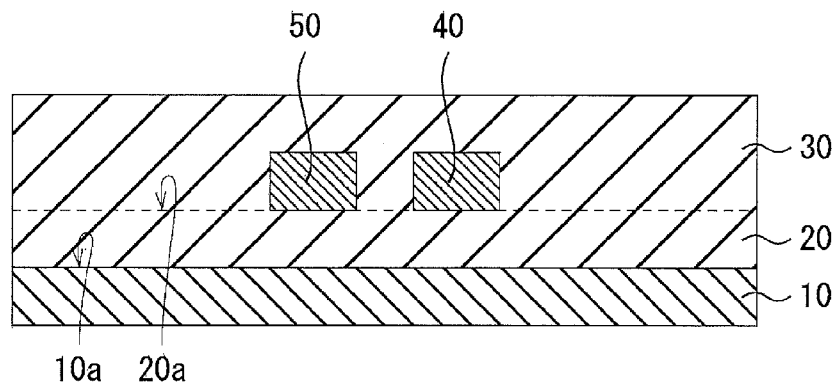
FIG. 1B is a schematic end view showing the directional coupler.

A directional coupler according to an embodiment of the present invention will be explained with reference to FIG. 1A and FIG. 1B. FIG. 1A is a schematic plan view showing the directional coupler. Note that, in FIG. 1A, an upper portion cladding layer that will be explained later is omitted from the illustration. FIG. 1B is a schematic end view as seen along a line I-I of the directional coupler shown in FIG. 1A.

A directional coupler 100 is configured to include a support substrate 10, a lower portion cladding layer 20, an upper portion cladding layer 30 and a first optical waveguide core 40 and a second optical waveguide core 50 that are disposed such as to be separated from each other and also parallel to each other.

The directional coupler 100 is used as a coupler in a wavelength filter, for example. Here, in the following explanation, a configuration example is explained of a case in which the directional coupler 100 is used as a coupler in a wavelength filter. Here, of one end 40a and another end 40b of the first optical waveguide core 40, and one end 50a and another end 50b of the second optical waveguide core 50, the one end 40a of the first optical waveguide core 40 is used as an input terminal Further, the other end 40b of the first optical waveguide core 40 and the other end 50b of the second optical waveguide core 50, which is disposed on the same side as the other end 40b of the first optical waveguide core 40, are used as output terminals. Accordingly, an optical waveguide core of a port portion etc. for input is connected to the one end (input terminal) 40a of the first optical waveguide core 40. Further, subsequent optical waveguide cores that configure a wavelength filter are connected to the other end (output terminal) 40b of the first optical waveguide core 40 and the other end (output terminal) 50b of the second optical waveguide core 50.

In this example, light that includes TE polarized waves and TM polarized waves is input from the input terminal 40a of the first optical waveguide core 40. The light that includes the TE polarized waves and the TM polarized waves is divided at a branching ratio that is dependent on a coupling length of the first optical waveguide core 40 and the second optical waveguide core 50. After the light that includes the TE polarized waves and the TM polarized waves is divided, the light is output from the output terminal 40b of the first optical waveguide core 40 and the output terminal 50b of the second optical waveguide core 50.

Note that, in the following explanation, a thickness direction is a direction that is orthogonal to a top surface 10a of the support substrate 10. Further, a direction along a direction of propagation of the light that is propagated through the first optical waveguide core 40 and the second optical waveguide core 50 is a length direction of the first optical waveguide core 40 and the second optical waveguide core 50. In addition, a direction that is orthogonal to the length direction and the thickness direction is a width direction.

The support substrate 10 is configured as a flat plate shape, of a material such as monocrystalline Si, for example.

The lower portion cladding layer 20 is formed on the support substrate 10 such that it covers the top surface 10a of the support substrate 10. The lower portion cladding layer 20 can be formed of $SiO_2$, for example. The first optical waveguide core 40 and the second optical waveguide core 50 are formed on top of the lower portion cladding layer 20.

The upper portion cladding layer 30 is formed such that it covers a top surface 20a of the lower portion cladding layer 20 and the first optical waveguide core 40 and the second optical waveguide core 50. The upper portion cladding layer 30 is formed of the same material as the lower portion cladding layer 20. Thus, if the lower portion cladding layer 20 is $SiO_2$, for example, the upper portion cladding layer 30 can also be formed of $SiO_2$.

The first optical waveguide core 40 and the second optical waveguide core 50 are formed of a material such as Si, for example, which has a higher refractive index than the lower portion cladding layer 20 and the upper portion cladding layer 30. Then, the lower surfaces of the first optical waveguide core 40 and the second optical waveguide core 50 are covered from below by the lower portion cladding layer 20 and the upper surfaces of the first optical waveguide core 40 and the second optical waveguide core 50 are covered from above by the upper portion cladding layer 30. As a result, the first optical waveguide core 40 and the second optical waveguide core 50 function, in actuality, as a transmission path of the light, and the light that is input into the first optical waveguide core 40 and the second optical waveguide core 50 is propagated in the propagation direction along the flat surface shape of the first optical waveguide core 40 and the second optical waveguide core 50.

The first optical waveguide core 40 and the second optical waveguide core 50 are formed to have equal widths, thicknesses and lengths.

In addition, the first optical waveguide core 40 and the second optical waveguide core 50 propagate either the TE polarized waves or the TM polarized waves of modes of a plurality of orders. In addition, the first optical waveguide core 40 and the second optical waveguide core 50 propagate the other polarization of at least one of the order modes. Note that, in the present embodiment, an explanation will be made of a case in which the first optical waveguide core 40 and the second optical waveguide core 50 propagate the TE polarized waves of a fundamental mode (a zeroth—order mode) and a first-order mode, and the TM polarized waves of the fundamental mode.

If one of the first optical waveguide core 40 and the second optical waveguide core 50 is considered to be a standard waveguide, the other can be considered to be a perturbed waveguide. Due to the presence of the perturbed waveguide, a dielectric constant (a refraction index) of the standard waveguide changes in comparison to a case in which the perturbed waveguide is not present. As a result, in an eigenmode of the standard waveguide, changes occur in an amplitude of an electromagnetic field in the propagation direction of the light. If the eigenmode of the first optical waveguide core 40 is designated as $E_a$, and the eigenmode of the second optical waveguide core 50 is designated as $E_b$, a mode coefficient of coupling κ between the first optical waveguide core 40 and the second optical waveguide core 50 is expressed by Formula 1 below.

[Formula 1]

$$\kappa = \frac{1}{4}\omega\varepsilon_0 \int E_a \delta\varepsilon E_b dS \qquad (1)$$

Note that, ω is an angular frequency, $\varepsilon_o$ is a dielectric constant in a vacuum, and $\delta\varepsilon$ is a perturbation of the dielectric constant that occurs due to the mutual existence of the optical waveguide cores.

Then, when the light is input from the input terminal 40a of the first optical waveguide core 40, the following Formula 2 and Formula 3 are obtained with respect to the coupling between modes that occurs between the first optical waveguide core 40 and the second optical waveguide core 50.

[Formula 2] and [Formula 3]

$$\left|\frac{A(z)}{A(0)}\right|^2 = 1 - \left(\frac{2\kappa}{\delta\beta}\right)^2 \sin^2\left(\frac{\delta\beta z}{2}\right) \qquad (2)$$

$$\left|\frac{B(z)}{A(0)}\right|^2 = \left(\frac{2\kappa}{\delta\beta}\right)^2 \sin^2\left(\frac{\delta\beta z}{2}\right) \qquad (3)$$

In Formula 2, A(0) and A (z) are functions indicating an amplitude of the light being propagated through the first optical waveguide core 40, as position coordinates (shown by a z axis in FIG. 1A). With respect to the light being propagated from a position coordinate 0 of the first optical waveguide core 40 (specifically, the input terminal 40a) to a coordinate position z, Formula 2 expresses a ratio between energy at the coordinate position 0 and energy at the coordinate position z. Further, B(z) is a function indicating, as a coordinate position, an amplitude of the light being propagated through the second optical waveguide core 50. With respect to the light moving from the position coordinate 0 of the first optical waveguide core 40 to the second optical waveguide core 50 and being propagated, Formula 3 expresses a ratio between the energy at the coordinate position 0 of the first optical waveguide core 40 and the energy at the coordinate position z of the second optical waveguide core 50. Thus, when the coupling length of the first optical waveguide core 40 and the second optical waveguide core 50 is z, under conditions at which the right side of Formula 2 above becomes 0 and the right side of Formula 3 above becomes 1, the light has moved completely from the first optical waveguide core 40 to the second optical waveguide core 50.

In addition, $\delta\beta$ in Formula 2 and Formula 3 above can be expressed by Formula 4 below. Note that $\beta_a$ represents a propagation coefficient of the eigenmode of the first optical waveguide core 40 and $\beta_b$ represents a propagation coefficient of the eigenmode of the second optical waveguide core 50.

[Formula 4]

$$\delta\beta = [(\beta_a - \beta_b)^2 + |2\kappa|^2]^{\frac{1}{2}} \quad (4)$$

Here, when the structure of the first optical waveguide core 40 and the second optical waveguide core 50 are the same, this results in $\beta_a=\beta_b$. Therefore, Formula 4 obtains $\delta\beta=2\kappa$. In this case, the above Formula 2 and Formula 3 can be modified to Formula 5 and Formula 6 below.

[Formula 5] and [Formula 6]

$$\left|\frac{A(z)}{A(0)}\right|^2 = \cos^2(\kappa z) \quad (5)$$

$$\left|\frac{B(z)}{A(0)}\right|^2 = \sin^2(\kappa z) \quad (6)$$

Thus, the light has moved completely from the first optical waveguide core 40 to the second optical waveguide core 50 when the coupling length of the first optical waveguide core 40 and the second optical waveguide core 50 is $L_c$ and $z=Lc=\pi/(2\kappa)$. Note that conditions at which $z=Lc=\pi/(2\kappa)$ is completed are referred to as complete coupling conditions. A coupling length L1 of the first optical waveguide core 40 and the second optical waveguide core 50 is set to be equal to the coupling length at which the complete coupling conditions are completed.

Alternatively, when the coupling length L1 is set to an odd multiple of the coupling length at which the complete coupling conditions are completed, 100% of the light that is input into the first optical waveguide core 40 moves to the second optical waveguide core 50, and when the coupling length L1 is set to an even multiple, 100% of the light returns to the first optical waveguide core 40. Further, the coupling length L1 of the first optical waveguide core 40 and the second optical waveguide core 50 can be a non-integer multiple of the coupling length at which the complete coupling conditions are completed. In this case, it is possible to output the light from the first optical waveguide core 40 and the second optical waveguide core 50 at a branching ratio that depends on a ratio corresponding to the coupling length at which he complete coupling conditions are completed.

On the other hand, it is possible to consider the first optical waveguide core 40 and the second optical waveguide core 50 to be coupling waveguides.

As the eigenmode in the coupling waveguides, there are even modes in which an electromagnetic field distribution has line symmetry and odd modes in which the electromagnetic field distribution has point symmetry. When there is no change in the structure of the coupling waveguides, the even mode and the odd mode propagate independently without any effect on each other.

For example, when the light is input into one of the first optical waveguide core 40 and the second optical waveguide core 50, the incident field of the light at the input terminal is deployed by the above-described even mode and odd mode. The even mode and the odd mode are excited at the same amplitude. When a propagation constant of the even mode is $\beta_{even}$, and a propagation constant of the odd mode is $\beta_{odd}$, a phase relation between the even mode and the odd mode with respect to a propagation distance L is $(\beta_{even}-\beta_{odd})L$. At a position coordinate $z=L_c=\pi/(\beta_{even}-\beta_{odd})$ at which this phase relation is $\pi$, the electromagnetic field distribution of the odd mode is an inverse of that of the even mode. Thus, the energy moves completely from one of the optical waveguide cores to the other optical waveguide core.

The coupling length $L_c$ of the coupling waveguides corresponds to the coupling length $L_c$ when the above-described first optical waveguide core 40 and second optical waveguide core 50 are considered to be the standard waveguide and the perturbed waveguide. Thus, the coupling length $L_c$ at which the complete coupling conditions are completed can be expressed as $L_c=\pi/(2\kappa)=\pi/(\beta_{even}-\beta_{odd})$. If this is modified, the mode coupling coefficient $\kappa$ can be expressed as $\kappa=\beta_{even}-(\beta_{odd})/2$. Then, if $\kappa=(\beta_{even}-\beta_{odd})/2$ is substituted into Formula 5 and Formula 6, the following Formula 7 and Formula 8 can be derived.

[Formula 7] and [Formula 8]

$$\left|\frac{A(z)}{A(0)}\right|^2 = \cos^2\left(\frac{\beta_{even} - \beta_{odd}}{2}z\right) \quad (7)$$

$$\left|\frac{B(z)}{A(0)}\right|^2 = \sin^2\left(\frac{\beta_{even} - \beta_{odd}}{2}z\right) \quad (8)$$

Here, in order to make the directional coupler 100 polarization-independent, it is necessary to make the mode coupling coefficient $\kappa$ between the first optical waveguide core 40 and the second optical waveguide core 50 match for the TE polarized waves and the TM polarized waves. Then, in order to cause the mode coupling coefficient $\kappa$ of the TE polarized waves and the TM polarized waves to match, it is sufficient if, from the above-described $\kappa=((\beta_{even}-\beta_{odd})/2$, a difference between the propagation constant $\beta_{even}$ of the even mode and the propagation constant $\beta_{odd}$ of the odd mode in the coupling waveguides match in the TE polarized waves and the TM polarized waves. Thus, for a propagation constant $\beta_{TEeven}$ of the even mode of the TE polarized waves, a propagation constant $\beta_{TEodd}$ of the odd mode of the TE polarized waves, a propagation constant $\beta_{TMeven}$ of the even mode of the TM polarized waves and a propagation constant $\beta_{TModd}$ of the odd mode of the TM polarized waves, by completing Formula 9 below, polarization independence conditions are satisfied.

[Formula 9]

$$\beta_{TEeven} - \beta_{TEodd} = \beta_{TMeven} - \beta_{TModd} \quad (9)$$

Here, each of the propagation constant $\beta_{TEeven}$ of the even mode of the TE polarized waves, the propagation constant $\beta_{TEodd}$ of the odd mode of the TE polarized waves, the propagation constant $\beta_{TMeven}$ of the even mode of the TM polarized waves and the propagation constant $\beta_{TModd}$ of the odd mode of the TM polarized waves are respectively different depending on the order mode. Thus, the mode coupling coefficient $\kappa$ is also different depending on the order mode.

As described above, in the present embodiment, the first optical waveguide core 40 and the second optical waveguide core 50 propagate the TE polarized waves of the fundamental mode and the first-order mode, and the TM polarized waves of the fundamental mode. Thus, it is conceivable that, for the TE polarized waves, coupling can be caused to occur between fundamental modes and between first-order modes, between the first optical waveguide core 40 and the second optical waveguide core 50. It is also conceivable that, for the TM polarized waves, coupling can be caused to occur between the fundamental modes. Note that the coupling in the fundamental mode and the first-order mode of the TE polarized waves can be considered to occur only to a degree that can be ignored, due to the fact that the propagation coefficients are different.

A mode coupling coefficient $\kappa_{TE0}$ of the fundamental mode of the TE polarized waves, a mode coupling coefficient $\kappa_{TE1}$ of the first-order mode of the TE polarized waves and a mode coupling coefficient $\kappa_{TM0}$ of the fundamental mode of the TM polarized waves can be expressed, respectively, by Formula 10 to Formula 12 below.

[Formula 10], [Formula 11] and [Formula 12]

$$\kappa_{TE0} = \frac{\beta_{TE0even} - \beta_{TE0odd}}{2} \quad (10)$$

$$\kappa_{TE1} = \frac{\beta_{TE1even} - \beta_{TE1odd}}{2} \quad (11)$$

$$\kappa_{TM0} = \frac{\beta_{TM0even} - \beta_{TM0odd}}{2} \quad (12)$$

It should be noted that in the above Formula 10, $\beta_{TE0even}$ represents the propagation constant of the even mode of the fundamental mode of the TE polarized waves and $\beta_{TE0odd}$ represents the propagation constant of the odd mode of the fundamental mode of the TE polarized waves. Further, in the above Formula 11, $\beta_{TE1even}$ represents the propagation constant of the even mode of the first-order mode of the TE polarized waves, and $\beta_{TE1odd}$ represents the propagation constant of the odd mode of the first-order mode of the TE polarized waves. In addition, in the above Formula 12, $\beta_{TM0even}$ represents the propagation constant of the even mode of the fundamental mode of the TM polarized waves and $\beta_{TE0odd}$ represents the propagation constant of the odd mode of the fundamental mode of the TM polarized waves.

Then, when the mode coupling coefficient $\kappa_{TE0}$ of the fundamental mode of the TE polarized waves or the mode coupling coefficient $\kappa_{TM1}$ of the first-order mode of the TE polarized waves and the mode coupling coefficient $\kappa_{TM0}$ of the fundamental mode of the TM polarized waves match each other, between the first optical waveguide core 40 and the second optical waveguide core 50, it is possible to make the directional coupler 100 polarization-independent. Therefore, a separation distance (a center-to-center distance of each of the optical waveguide cores) D1 between the first optical waveguide core 40 and the second optical waveguide core 50, and a width W1 and a width W2 of the first optical waveguide core 40 and the second optical waveguide core 50 are set such that one of either $\kappa_{TE0}=\kappa_{TM0}$ or $\kappa_{TE1}=\kappa_{TM0}$ is completed. If a design is adopted such that $\kappa_{TE0}=\kappa_{TM0}$, between the first optical waveguide core 40 and the second optical waveguide core 50, the fundamental modes of the TE polarized waves are coupled and the fundamental modes of the TM polarized waves are coupled. Meanwhile, if a design is adopted such that $\kappa_{TE1}=\kappa_{TM0}$, between the first optical waveguide core 40 and the second optical waveguide core 50, the first-order modes of the TE polarized waves are coupled and the fundamental modes of the TM polarized waves are coupled.

In this manner, in the directional coupler 100, the first optical waveguide core 40 and the second optical waveguide core 50 can propagate the plurality of order modes of the at least one polarization. In this way, it is possible to expand the order mode selectivity of each of the polarizations that are coupled between the first optical waveguide core 40 and the second optical waveguide core 50. As a result, it is possible to expand the selectivity of the mode coupling coefficient that causes the matching in each of the polarizations. Then, at the design stage, it is possible to freely select the mode coupling coefficient that causes the matching in each of the polarizations. Therefore, when using the directional coupler 100 in a polarization-independent manner, there is a greater freedom of design with respect to the thickness of the optical waveguide core.

It should be noted that, in the present embodiment, the explanation is given of the case in which the first optical waveguide core 40 and the second optical waveguide core 50 propagate the TE polarized waves of the fundamental mode and the first-order mode and the TM polarized waves of the fundamental mode.

However, the order modes of each of the polarizations propagated by the first optical waveguide core 40 and the second optical waveguide core 50 are not limited to this example. The first optical waveguide core 40 and the second optical waveguide core 50 can be set to propagate ether the TE polarized waves or the TM polarized waves of an m-th order mode (where m is an integer of 1 or more) and propagate the orthogonal polarization of an n-th order mode (where n is an integer of 0 or more). Then, the separation distance between the first optical waveguide core 40 and the second optical waveguide core 50 and the widths of the first optical waveguide core 40 and the second optical waveguide core 50 can be set such that a mode coupling coefficient of a p-th order mode (where p is an integer satisfying $0 \leq p \leq m$) of one of the polarizations and a mode coupling coefficient of a q-th order mode (where q is an integer satisfying $0 \leq q \leq n$) of the other polarization match each other between the first optical waveguide core 40 and the second optical waveguide core 50. In this manner, by making the order mode of at least one of the polarizations that can be propagated by the first optical waveguide core 40 and the second optical waveguide core 50 a higher-order mode, it is possible to further expand the selectivity of the mode coupling coefficient that causes the matching in each of the polarizations.

The inventors performed a simulation in order to determine an appropriate design example as a usage format of the directional coupler 100. Note that, in the following simulation, the wavelength of a optical signal input into the directional coupler 100 was 1.55 µm. Further, the first optical waveguide core 40 and the second optical waveguide core 50 were made of Si having a thickness of 0.22 µm, and the lower portion cladding layer 20 and the upper portion cladding layer 30 were made of $SiO_2$.

Then, the object was to calculate a design example in a case in which the TE polarized waves of the first-order mode are coupled and the TM polarized waves of the fundamental mode are coupled, between the first optical waveguide core 40 and the second optical waveguide core 50. In this case, it is a condition to match the mode coupling coefficient $\kappa_{TM1}$ of the first-order mode of the TE polarized waves and the mode coupling coefficient $\kappa_{TM0}$ of the fundamental mode of the TM polarized waves. Here, using the relationship $L_c=\pi/(2\kappa=\pi/(\beta_{even}-\beta_{odd})$, a relative relationship $L_{cTM}/L_{cTE}$ between a coupling length $L_{cTM}$ of the fundamental mode of the TM polarized waves and a coupling length $L_{cTE}$ of the first-order mode of the TE polarized waves was investigated. Then, relationships between $L_{cTM}/L_{cTE}$, the separation distance D1 between the first optical waveguide core 40 and the second optical waveguide core 50 and the widths W1 and W2 of the first optical waveguide core 40 and the second optical waveguide core 50 were respectively verified. Note that in an eigenmode analysis, the finite element method (FEM) was used.

First, the relationship between $L_{cTM}/L_{cTE}$ and the separation distance D1 between the first optical waveguide core 40 and the second optical waveguide core 50 was investigated. Here, the widths of the first optical waveguide core 40 and the second optical waveguide core 50 were each 0.6 µm and trends in changes of $L_{cTM}/L_{cTE}$ with respect to the separation distance D1 were verified. The results are shown in FIG. 2A.

Figure 2A:
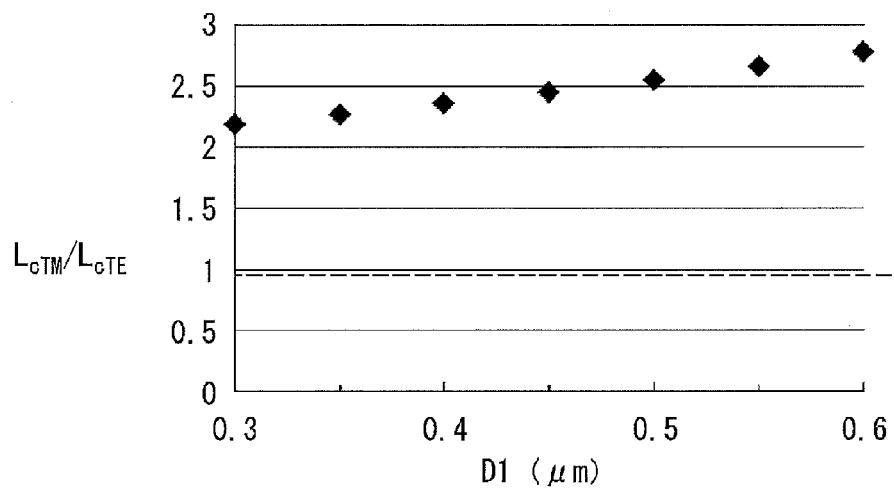
FIG. 2A is a diagram illustrating a simulation to determine an appropriate design example of the directional coupler.

FIG. 2A is a diagram showing the relationship between $L_{cTM}/L_{cTE}$ and the separation distance D1. In FIG. 2A, the vertical axis shows $L_{cTM}/L_{cTE}$ in a desired unit, and the horizontal axis shows the separation distance D1 between the first optical waveguide core 40 and the second optical waveguide core 50 in units of µm.

When $L_{cTM}=L_{cTE}$ (that is when $L_{cTM}/L_{cTE}=1$), the mode coupling coefficient $\kappa_{TE1}$ of the first-order mode of the TE polarized waves and the mode coupling coefficient $\kappa_{TM0}$ of the fundamental mode of the TM polarized waves match each other and polarization independence is achieved. Thus, as shown in FIG. 2A, it can be seen that the smaller the separation distance D1 between the first optical waveguide core 40 and the second optical waveguide core 50, the smaller the polarization dependence. Here, the separation distance D1 between the first optical waveguide core 40 and the second optical waveguide core 50 is determined at 0.3 µm.

Next, the relationship between $L_{cTM}/L_{cTE}$ and the widths W1 and W2 of the first optical waveguide core 40 and the second optical waveguide core 50, when the separation distance D1 between the first optical waveguide core 40 and the second optical waveguide core 50 is 0.3 µm, was verified. The results are shown in FIG. 2B.

Figure 2B:
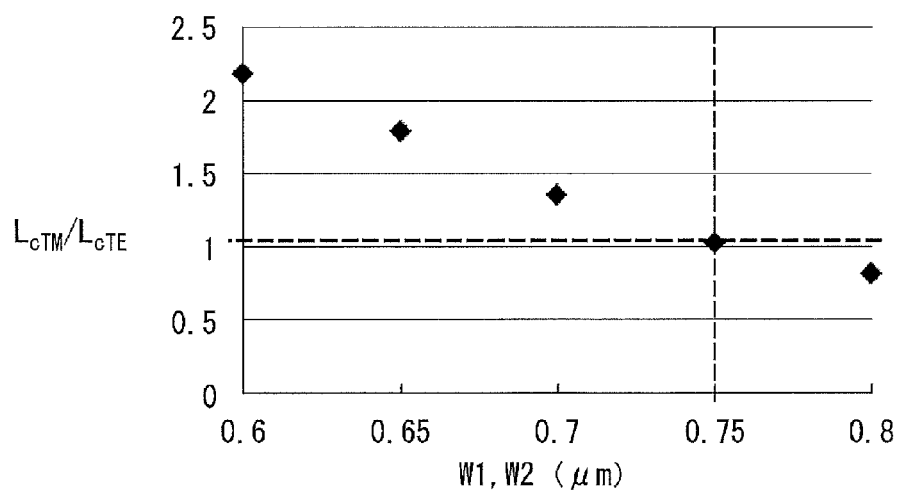
FIG. 2B is a diagram illustrating a simulation to determine an appropriate design example of the directional coupler.

FIG. 2B is a diagram showing the relationship between $L_{cTM}/L_{cTE}$ and the widths W1 and W2. Note that, as described above, as the first optical waveguide core 40 and the second optical waveguide core 50 are designed to have an equal width, W1=W2. In FIG. 2B, the vertical axis shows $L_{cTM}/L_{cTE}$ in a desired unit, and the horizontal axis shows the widths W1 and W2 of the first optical waveguide core 40 and the second optical waveguide core 50 in units of µm.

As shown in FIG. 2B, when W1=W2=0.75 µm, $L_{cTM}/L_{cTE}=1$. Thus, when the widths W1 and W2 of the first optical waveguide core 40 and the second optical waveguide core 50 are 0.75 µm, the mode coupling coefficient $\kappa_{TE1}$ of the first-order mode of the TE polarized waves and the mode coupling coefficient $\kappa_{TM0}$ of the fundamental mode of the TM polarized waves match each other.

From the above results, it was verified that the mode coupling coefficient $\kappa_{TE1}$ of the first-order mode of the TE polarized waves and the mode coupling coefficient $\kappa_{TM0}$ of the fundamental mode of the TM polarized waves match each other when the separation distance D1 between the first optical waveguide core 40 and the second optical waveguide core 50 is 0.3 µm and the widths W1 and W2 of the first optical waveguide core 40 and the second optical waveguide core 50 are 0.75 µm. Thus, by making the design using these conditions, for example, it is possible to make the directional coupler 100 polarization-independent.

(Optical Waveguide Element)

Figure 3:
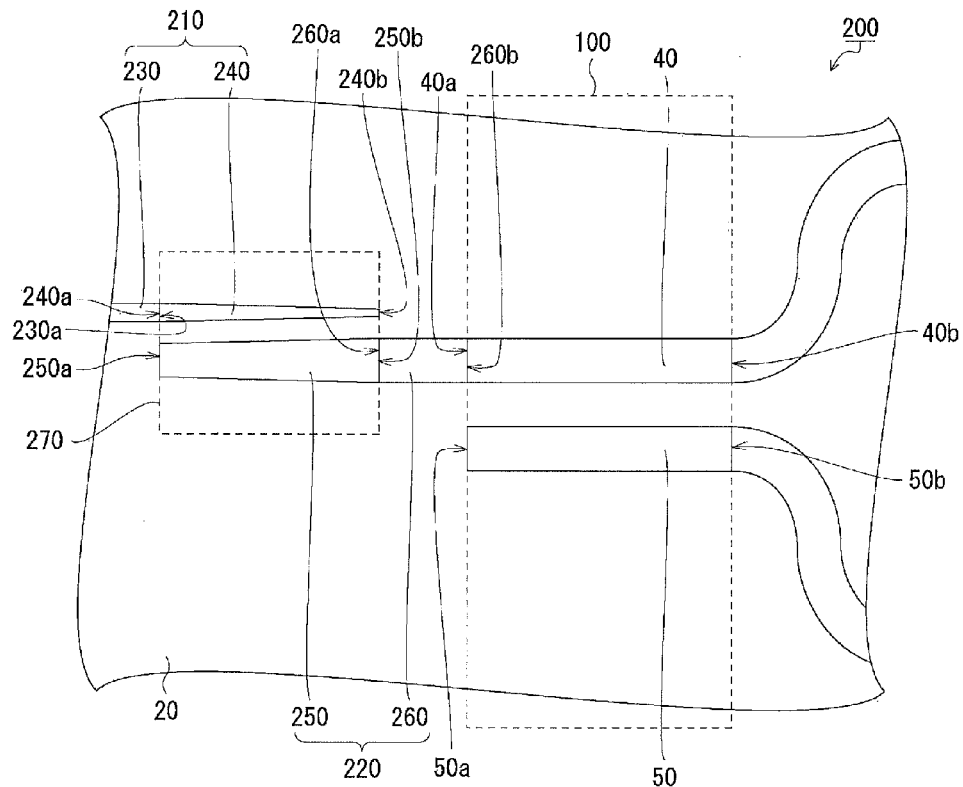
FIG. 3 is a schematic plan view showing an optical waveguide element provided with the directional coupler.

An optical waveguide element that is provided with the above-described directional coupler 100 (refer to FIG. 1A and FIG. 1B) will be explained with reference to FIG. 3. FIG. 3 is a schematic plan view showing the optical waveguide element. Note that, in FIG. 3, the upper portion cladding layer 30 is not illustrated. Further, the same reference numerals are assigned to structural elements that are common to the directional coupler 100 and an explanation thereof is omitted.

As described above, in the directional coupler 100, the first optical waveguide core 40 and the second optical waveguide core 50 are able to propagate the plurality of order modes of at least one of the polarizations. Then, coupling occurs for one of the selected order modes for each of the polarizations, between the first optical waveguide core 40 and the second optical waveguide core 50 (specifically, they operate as a directional coupler). As a result, it is necessary to input each of the polarizations of the order mode coupled between the first optical waveguide core 40 and the second optical waveguide core 50 into the directional coupler 100.

Here, in addition to the above-described directional coupler 100 (refer to FIG. 1A and FIG. 1B) an optical waveguide element 200 is provided with a first sub-waveguide core 210, which includes a port portion 230 and a first converter 240, and a second sub-waveguide core 220, which includes a second converter 250 and a connection portion 260. The first sub-waveguide core 210 and the second sub-waveguide core 220 are formed on the lower portion cladding layer 20, and are made of the same material and have the same thickness as the first optical waveguide core 40 and the second optical waveguide core 50 of the directional coupler 100. Further, a mode conversion area 270 is set such that the first sub-waveguide core 210 and the second sub-waveguide core 220 are arranged to be separated from and aligned with each other.

In the optical waveguide element 200, the order modes of the TE polarized waves and the TM polarized waves input into the port portion 230 are converted by the mode conversion area 270, in line with the order modes coupled between the first optical waveguide core 40 and the second optical waveguide core 50. Here, as an example, the configuration example is explained of the case in which the first-order mode with respect to the TE polarized waves and the fundamental mode with respect to the TM polarized waves are respectively coupled between the first optical waveguide core 40 and the second optical waveguide core 50. It should be noted that the TE polarized waves and the TM polarized waves input into the port portion 230 are both in the fundamental mode.

In this example, the optical signal included in the TE polarized waves and the TM polarized waves of the fundamental mode are input into the port portion 230 of the first sub-waveguide core 210 and are transmitted to the first converter 240. The TE polarized waves of the fundamental mode propagated through the first converter 240 are converted to the first-order mode in the mode conversion area 270, and transmitted to the second converter 250 of the second sub-waveguide core 220. In addition, the TM polarized waves of the fundamental mode propagated through the first converter 240 are not mode-converted in the mode conversion area 270 and are transmitted to the second converter 250 of the second sub-waveguide core 220.

The optical signal including the TE polarized waves of the first-order mode and the TM polarized waves of the fundamental mode transmitted to the second converter 250 passes through the connection portion 260 and is input into the first optical waveguide core 40 of the directional coupler 100. In the directional coupler 100, the optical signal is divided at the branching ratio that is dependent on the coupling length of the first optical waveguide core 40 and the second optical waveguide core 50. The divided optical signals respectively include the TE polarized waves of the first-order mode and the TM polarized waves of the fundamental mode. The divided optical signals are respectively output from the output terminal 40b of the first optical waveguide core 40 and the output terminal 50b of the second optical waveguide core 50.

The port portion 230 is set to a width that satisfies single mode conditions with respect to the TE polarized waves and the TM polarized waves. Thus, the TE polarized waves and the TM polarized waves of the fundamental mode are propagated. One end 230a of the port portion 230 is connected to one end 240a of the first converter 240.

The first converter 240 propagates the TE polarized waves and the TM polarized waves of the fundamental mode. Further, the second converter 250 propagates the TE polarized waves of the fundamental mode and the first-order mode, and the TM polarized waves of the fundamental mode.

In addition, the first converter 240 is set as a portion of the first sub-waveguide core 210 that is arranged to be separated from and aligned with the second sub-waveguide core 220. Further, the second converter 250 is set as a portion of the second sub waveguide core 220 that is arranged to be separated from and aligned with the first sub-waveguide core 210. Thus, the mode conversion area 270 is set as an area in which the first converter 240 and the second converter 250 are arranged to be separated from and aligned with each other.

The connection portion 260 propagates the TE polarized waves of the fundamental mode and the first-order mode, and the TM polarized waves of the fundamental mode. One end 260a of the connection portion 260 is connected to another end 250b of the second converter 250. Further, another end 260b of the connection portion 260 is connected to the one end 40a of the first optical waveguide core 40.

Figure 4:
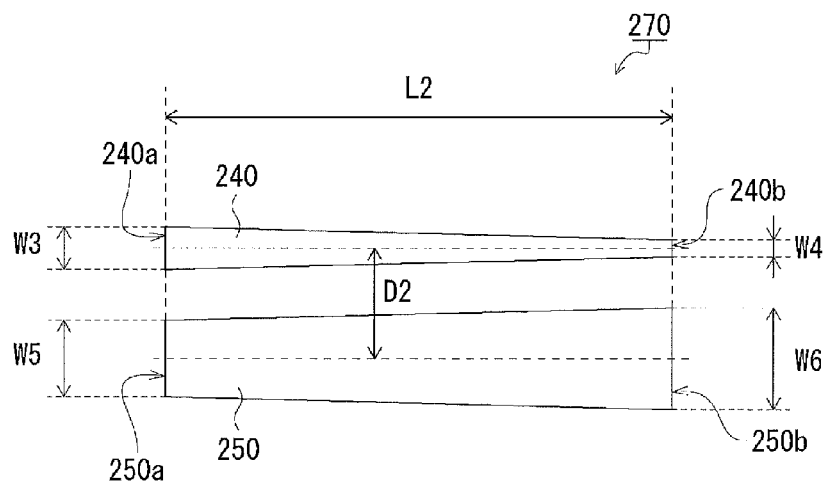
FIG. 4 is a schematic plan view showing a mode conversion area.

The mode conversion area 270 will be explained with reference to FIG. 4. FIG. 4 is a schematic plan view illustrating the mode conversion area 270. Note that, in FIG. 4, the support substrate 10, the lower portion cladding layer 20 and the upper portion cladding layer 30 are not illustrated.

The TE polarized waves of the fundamental mode being propagated through the first converter 240 and the TE polarized waves of the first-order mode being propagated through the second converter 250 are coupled in the mode conversion area 270. Further, the TM polarized waves of the fundamental mode being propagated through the first converter 240 and the TM polarized waves of the fundamental mode being propagated through the second converter 250 are coupled.

Central axes of the first converter 240 and the second converter 250 are respectively parallel to each other. In addition, the first converter 240 and the second converter 250 are arranged such that the one end 240a of the first converter 240 and the one end 250a of the second converter 250 are aligned with each other. Furthermore, the other end 240b of the first converter 240 and the other end 250b of the second converter 250 are arranged such that they are aligned with each other.

The first converter 240 has a tapered shape such that a width of the first converter 240 becomes continuously narrower from the one end 240a toward the other end 240b. A width W3 of the one end 240a and a width W4 of the other end 240b of the first converter 240 are respectively set to correspond to an equivalent refractive index at which the TE polarized waves and the TM polarized waves of the fundamental mode can be propagated.

Further, the second converter 250 has a tapered shape such that a width of the second converter 250 expands continuously from the one end 250a toward the other end 250b. A width W5 of the one end 250a of the second converter 250 is set to correspond to an equivalent refractive index at which the TE polarized waves and the TM polarized waves of the fundamental mode can be propagated. In addition, a width W6 of the other end 250b of the second converter 250 is set to correspond to an equivalent refractive index at which the TE polarized waves of the first-order mode and the TM polarized waves of the fundamental mode can be propagated.

Here, an equivalent refractive index $N_{W3TE0}$ of the TE polarized waves of the fundamental mode at the one end 240a of the first converter 240 is set to be larger than an equivalent refractive index $N_{W5TE0}$ of the TE polarized waves of the fundamental mode at the one end 250a of the second converter 250. Further, an equivalent refractive index $N_{W3TM0}$ of the TM polarized waves of the fundamental mode at the one end 240a of the first converter 240 is set to be larger than an equivalent refractive index $N_{W5TM0}$ of the TM polarized waves of the fundamental mode at the one end 250a of the second converter 250. Thus, the width W3 of the one end 240a of the first converter 240 and the width W5 of the one end 250a of the second converter 250 are designed such that $N_{W3TE0} > N_{W5TE0}$ and $N_{W3TM0} > N_{W5TM0}$ are satisfied.

In addition, an equivalent refractive index $N_{W6TE1}$ of the TE polarized waves of the first-order mode at the other end 250b of the second converter 250 is set to be larger than an equivalent refractive index $N_{W4TE0}$ of the TE polarized waves of the fundamental mode at the other end 240b of the first converter 240. Further, an equivalent refractive index $N_{W6TM0}$ of the TM polarized waves of the fundamental mode at the other end 250b of the second converter 250 is set to be larger than an equivalent refractive index $N_{W4TM0}$ of the TM polarized waves of the fundamental mode at the other end 240b of the first converter 240. Thus, the width W6 of the other end 250b of the second converter 250 and the width W4 of the other end 240b of the first converter 240 are designed such that $N_{W6TE1} > N_{W4TE0}$ and $N_{W6TM0} > N_{W4TM0}$ are satisfied.

In the mode conversion area 270 that is designed in this manner, there is a point at which the equivalent refractive index of the TE polarized waves of the fundamental mode of the first converter 240 and the equivalent refractive index of the TE polarized waves of the first-order mode of the second converter 250 match. Further, there are points at which the equivalent refractive index of the TM polarized waves of the fundamental mode of the first converter 240 and the equivalent refractive index of the TM polarized waves of the fundamental mode of the second converter 250 match. As a result, it is possible to couple the TE polarized waves of the fundamental mode being propagated through the first converter 240 and the TE polarized waves of the first-order mode being propagated through the second converter 250. Further, it is possible to couple the TM polarized waves of the fundamental mode being propagated through the first converter 240 and the TM polarized waves of the fundamental mode being propagated through the second converter 250. Thus, the TE polarized waves of the fundamental mode being propagated through the first converter 240 are converted to the first-order mode and are transmitted to the second converter 250 of the second sub-waveguide core 220.

In addition, the TM polarized waves of the fundamental mode being propagated through the first converter 240 are not mode-converted and are transmitted to the second converter 250 of the second sub waveguide core 220.

Here, the inventors performed a simulation to determine a preferable design example of the mode conversion area 270.

As already described above, the first converter 240 is designed such that the TE polarized waves and the TM polarized waves of the fundamental mode can be propagated. Meanwhile, the second converter 250 is designed such that the TE polarized waves of the fundamental mode and the first-order mode, and the TM polarized waves of the fundamental mode can be propagated. Then, the width W3 of the one end 240a of the first converter 240 and the width W4 of the other end 240b, and the width W5 of the one end 250a of the second converter 250 and the width W6 of the other end 250b are set such that the above-described relationship $N_{W3TE0}>N_{W5TE0}$ and $N_{W3TM0}>N_{W5TM0}$, and the above-described relationship $N_{W6TE1}>N_{W4TE0}$ and $N_{W6TM0}>N_{W4TM0}$ are satisfied. The inventors used FEM to obtain a design example of the first converter 240 and the second converter 250 satisfying these conditions. Note that, here, a preferable design example was obtained for light having a wavelength of 1.55 μm. Further, a case was assumed in which the first converter 240 and the second converter 250 were made of Si and had a thickness of 0.22 μm, and the lower portion cladding layer 20 and the upper portion cladding layer 30 were made of $SiO_2$.

As a result, the width W3 of the one end 240a of the first converter 240 and the width W4 of the other end 240b were determined at W3=0.44 μm and W4=0.35 μm. In addition, the width W5 of the one end 250a of the second converter 250 and the width W6 of the other end 250b were determined at W5=0.6 μm and W6=0.8 μm. Further, a separation distance (a center-to-center distance of each of the converters) D2 between the first converter 240 and the second converter 250 was determined at D2=0.74 μm. Further, a length of the first converter 240 and the second converter 250, that is, a length L2 of the mode conversion area 270 was determined at L2=80 μm.

The inventors evaluated the characteristics of the mode conversion area 270 of this design example using the beam propagation method (BPM). As a result, coupling efficiency of the TE polarized waves of the fundamental mode and the TE polarized waves of the first-order mode, in the first converter 240 and the second converter 250, was around −0.53 dB. In addition, the coupling efficiency of the TM polarized waves of the fundamental mode and the TM polarized waves of the fundamental mode, in the first converter 240 and the second converter 250, was around −0.1 dB. From these results, it was verified that mode conversion with respect to a desired polarization is possible with the mode conversion area 270.

In this manner, in the optical waveguide element 200, the optical signal input from the port portion 230 can be mode-converted in the mode conversion area 270. Thus, each of the polarizations of the order mode corresponding to the order mode coupled between the first optical waveguide core 40 and the second optical waveguide core 50 can be input into the directional coupler 100.

It should be noted that, here, the configuration has been explained in which, in the mode conversion area 270, the TE polarized waves of the fundamental mode and the TE polarized waves of the first-order mode are coupled and the TM polarized waves of the fundamental mode and the TM polarized waves of the fundamental mode are coupled. However, the configuration of the mode conversion area 270 is not limited to this example. It is possible to change the configuration as desired, in accordance with the order mode of the TE polarized waves and the TM polarized waves input from the port portion 230, and the order mode of the TE polarized waves and the TM polarized waves coupled in the directional coupler 100. In this case, by setting the width W3 of the one end 240a of the first converter 240 and the width W4 of the other end 240b, and the width W5 of the one end 250a of the second converter 250 and the width W6 of the other end 250b as appropriate, it is possible to couple one polarization of an i-th mode (where i is an integer of 0 or more) that is propagated through the first converter 240 and identical polarization of an m-th mode (where m is an integer of 1 or more) that is propagated through the second converter 250. Further, it is possible to couple the other polarization of a j-th mode (where j is an integer of 0 or more) that is propagated through the first converter 240 and the identical polarization of a n-th mode (where n is an integer of 0 or more) that is propagated through the second converter 250.

(First wavelength filter)

Figure 5:
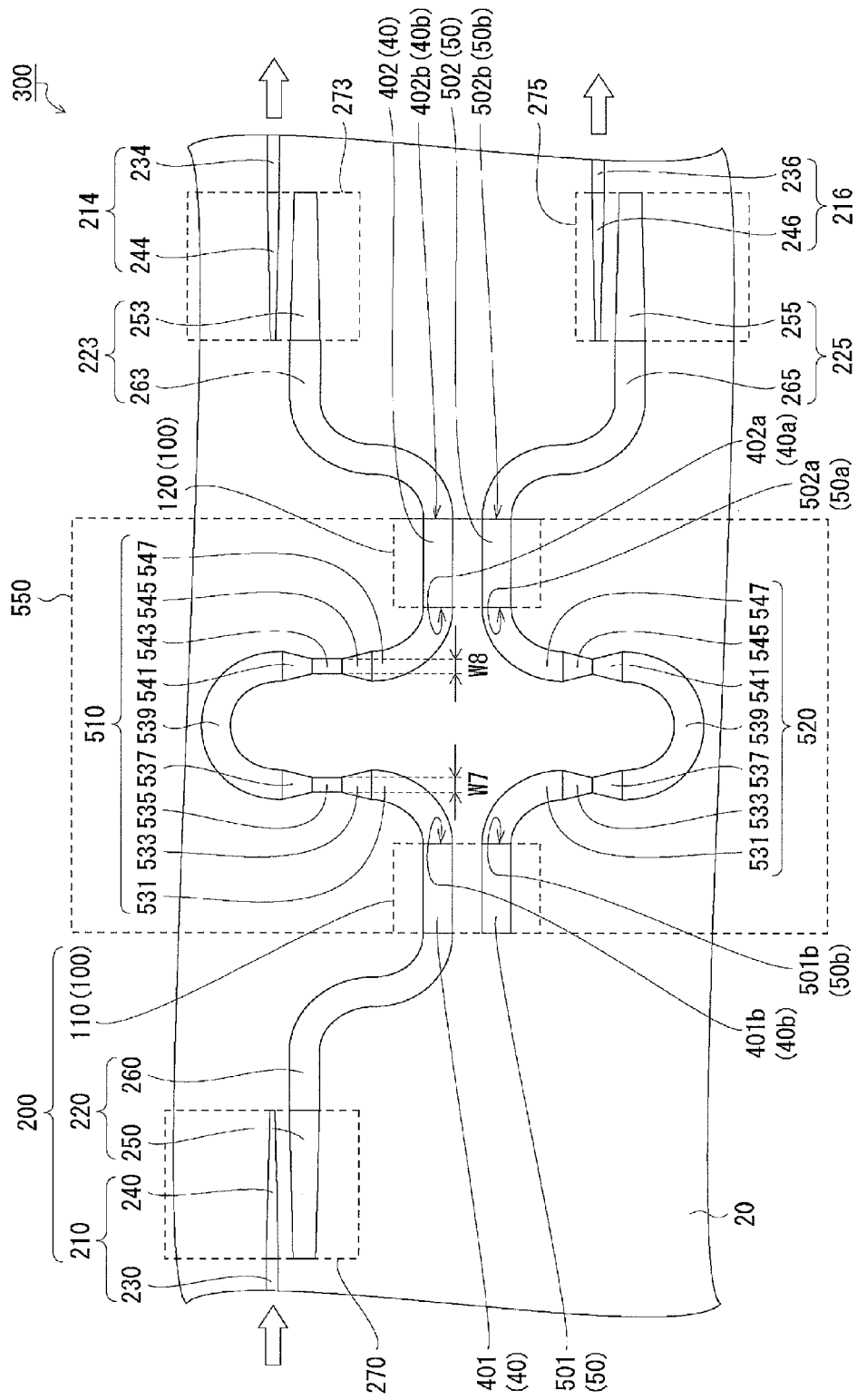
FIG. 5 is a schematic plan view showing a first wavelength filter.

A first wavelength filter that uses the above-described directional coupler 100 will be explained with reference to FIG. 5. FIG. 5 is a schematic plan view showing the first wavelength filter. Note that, in FIG. 5, the upper portion cladding layer 30 is not illustrated. Further, the same reference numerals are assigned to structural elements that are common to the directional coupler 100 (refer to FIG. 1A and FIG. 1B) and the optical waveguide element 200 (refer to FIG. 3) and an explanation thereof is omitted here.

A first wavelength filter 300 is a Mach-Zehnder type wavelength filter that uses the above-described directional coupler 100 as a coupler.

The first wavelength filter 300 is provided with two of the similarly designed directional couplers 100 (a first directional coupler 110 and a second directional coupler 120) and a pair of arm cores (a first arm core 510 and a second arm core 520) having mutually different optical path lengths that are provided between the first directional coupler 110 and the second directional coupler 120. The first arm core 510 and the second arm core 520 are formed on the lower portion cladding layer 20 and are made of the same material and have the same thickness as the first optical waveguide core 40 and the second optical waveguide core 50 the directional coupler 100.

The first arm core 510 forms a connection between an output terminal 401b of a first optical waveguide core 401 provided in the first directional coupler 110 and an input terminal 402a of a first optical waveguide core 402 provided in the second directional coupler 120. Further, the second arm core 520 forms a connection between an output terminal 501b of a second optical waveguide core 501 that is provided in the first directional coupler 110 and an input terminal 502a of a second optical waveguide core 502 that is provided in the second directional coupler 120.

A wavelength filter portion 550 is configured by the first directional coupler 110, the second directional coupler 120, the first arm core 510 and the second arm core 520.

In addition, the first wavelength filter 300 is provided with the first sub-waveguide core 210 and the second sub-waveguide core 220. Then, the above-described optical waveguide element 200 is configured by the first sub-waveguide core 210 and the second sub-waveguide core 220, and the first directional coupler 110.

Additionally, a third sub-waveguide core 223 is connected to an output terminal 402b of the first optical waveguide core 402 of the second directional coupler 120. Further, a fourth sub-waveguide core 214 is provided such that it is arranged to be separated from and aligned with the third sub-waveguide core 223.

The third sub-waveguide core 223 is formed to have the same design as the second sub-waveguide core 220. Further, the fourth sub-waveguide core 214 is formed to have the same design as the first sub-waveguide core 210. Then, the third sub-waveguide core 223 and the fourth sub-waveguide core 214 are provided in an arrangement relationship that is the same as that of the second sub waveguide core 220 and the first sub-waveguide core 210. Thus, the third sub-waveguide core 223 includes a connection portion 263 and a third converter 253. Further, the fourth sub-waveguide core 214 includes a fourth converter 244 and a port portion 234. Then, a mode conversion area 273 is set in which the third converter 253 and the fourth converter 244 are arranged to be separated from and aligned with each other.

In addition, a fifth sub-waveguide core 225 is connected to an output terminal 502b of the second optical waveguide core 502 of the second directional coupler 120. Further, a sixth sub-waveguide core 216 is provided such that it is arranged to be separated from and aligned with the fifth sub-waveguide core 225.

The fifth sub-waveguide core 225 is formed to have the same design as the second sub-waveguide core 220. Further, the sixth sub-waveguide core 216 is formed to have the same design as the first sub-waveguide core 210. Then, the fifth sub-waveguide core 225 and the sixth sub-waveguide core 216 are provided in an arrangement relationship that is the same as that of the second sub-waveguide core 220 and the first sub-waveguide core 210. Thus, the fifth sub-waveguide core 225 includes a connection portion 265 and a fifth converter 255. Further, the sixth sub-waveguide core 216 includes a sixth converter 246 and a port portion 236. Then, a mode conversion area 275 is set in which the fifth converter 255 and the sixth converter 246 are arranged to be separated from and aligned with each other.

The first wavelength filter 300 is used, for example, as a multiplexing/demultiplexing filter for optical signals of two wavelengths that are the same or different. Here, as an example, a configuration example is explained in which the optical signal of the fundamental mode is input from the port portion (input portion) 230 and, after the optical signal is divided by the wavelength filter portion 550 into optical signals of two wavelengths on different paths, the respective optical signals of the fundamental mode are output from the port portion (first output port portion) 234 and the port portion (second output port portion) 236. It should be noted that, here, the first directional coupler 110 and the second directional coupler 120 are configured to respectively couple the first-order mode with respect to the TE polarized waves and the fundamental mode with respect to the TM polarized waves.

In this example, the optical signal that includes the TE polarized waves and the TM polarized waves of the fundamental mode is input to the input port portion 230. The TE polarized waves of the fundamental mode are converted into the TE polarized waves of the first-order mode in the mode conversion area 270. Further, the TM polarized waves of the fundamental mode are not mode-converted in the mode conversion area 270 and the fundamental mode is maintained.

The optical signal that includes the TE polarized waves of the first-order mode and the TM polarized waves of the fundamental mode passes through the connection portion 260, and is input into the first optical waveguide core 401 of the first directional coupler 110. In the first directional coupler 110, the optical signal is divided at a branching ratio that is dependent on a coupling length of the first optical waveguide core 401 and the second optical waveguide core 501. The divided optical signals include the TE polarized waves of the first-order mode and the TM polarized waves of the fundamental mode, respectively. The divided optical signals are respectively input into the first arm core 510 and the second arm core 520.

The optical signal that is propagated through the first arm core 510 is input into the first optical waveguide core 402 of the second directional coupler 120.

Further, the optical signal that is propagated through the second arm core 520 is input into the second optical waveguide core 502 of the second directional coupler 120. Due to this, there is interference between the optical signal from the first arm core 510 and the optical signal from the second arm core 520 in the second directional coupler 120. As a result, an optical signal of a wavelength that is dependent on a coupling length L1a of the first optical waveguide core 401 and the second optical waveguide core 501 in the first directional coupler 110, a coupling length L1b of the first optical waveguide core 402 and the second optical waveguide core 502 in the second directional coupler 120, and an optical path length difference between the first arm core 510 and the second arm core 520 is output from the first optical waveguide core 402 and the second optical waveguide core 502. The branching ratio of the optical signals output from the first optical waveguide core 402 and the second optical waveguide core 502 corresponds to the coupling length L1a, the coupling length L1b and the optical path length difference between the first arm core 510 and the second arm core 520. The optical signals output from the first optical waveguide core 402 and the second optical waveguide core 502 respectively include the TE polarized waves of the first-order mode and the TM polarized waves of the fundamental mode.

The optical signal that is output from the first optical waveguide core 402 is input into the connection portion 263. Then, the TE polarized waves of the first-order mode included in the optical signal are converted, in the mode conversion area 273, to TE polarized waves of the fundamental mode. Further, the TM polarized waves of the fundamental mode included in the optical signal are not mode-converted in the mode conversion area 273 and the fundamental mode is maintained. The optical signal that includes the TE polarized waves and the TM polarized waves of the fundamental mode is output from the first output port portion 234. Meanwhile, the optical signal that is output from the second optical waveguide core 502 is input into the connection portion 265. Then, the TE polarized waves of the first-order mode included in the optical signal are converted, in the mode conversion area 275, to TE polarized waves of the fundamental mode. Further, the TM polarized waves of the fundamental mode included in the optical signal are not mode-converted in the mode conversion area 275 and the fundamental mode is maintained. The optical signal that includes the TE polarized waves and the TM polarized waves of the fundamental mode is output from the second output port portion 236.

Note that designs of the mode conversion areas 270, 273 and 275 are optimized in accordance with a wavelength that is to be produced by the first wavelength filter 300.

A configuration example of the first arm core 510 and the second arm core 520 will be explained.

The first arm core 510 is configured such that a first curved waveguide portion 531, a first tapered portion 533, a first adjustment portion 535, a second tapered portion 537, a second curved waveguide portion 539, a third tapered portion 541, a second adjustment portion 543, a fourth tapered portion 545 and a third curved waveguide portion 547 are connected in that order. Each of these structural elements propagates the TE polarized waves of the first-order mode and the TM polarized waves of the fundamental mode.

One end of the first curved waveguide portion 531 is connected to the output terminal 401b of the first optical waveguide core 401 of the first directional coupler 110 and the other end is connected to the first tapered portion 533. One end of the third curved waveguide portion 547 is connected to the fourth tapered portion 545 and the other end is connected to the input terminal 402a of the first optical waveguide core 402 of the second directional coupler 120.

The first tapered portion 533 is configured such that its width continuously changes from an end connected to the first curved waveguide portion 531 to an end connected to the first adjustment portion 535. Further, the second tapered portion 537 is configured such that its width continuously changes from an end connected to the first adjustment portion 535 to an end connected to the second curved waveguide portion 539. Further, the third tapered portion 541 is configured such that its width continuously changes from an end connected to the second curved waveguide portion 539 to an end connected to the second adjustment portion 543. In addition, the fourth tapered portion 545 is configured such that its width continuously changes from an end connected to the second adjustment portion 543 to an end connected to the third curved waveguide portion 547. By providing the first tapered portion 533, the second tapered portion 537, the third tapered portion 541 and the fourth tapered portion 545, it is possible to resolve inconsistencies in width between each of the first curved waveguide portion 531, the first adjustment portion 535, the second curved waveguide portion 539, the second adjustment portion 543 and the third curved waveguide portion 547.

The second arm core 520 is configured such that the first curved waveguide portion 531, the first tapered portion 533, the second tapered portion 537, the second curved waveguide portion 539, the third tapered portion 541, the fourth tapered portion 545 and the third curved waveguide portion 547 are similarly designed to the first arm core 510 and connected in that order.

By providing the first adjustment portion 535 and the second adjustment portion 543 only on the first arm core 510 in this manner, an optical path length difference occurs between the first arm core 510 and the second arm core 520. Then, by adjusting the lengths of the first adjustment portion 535 and the second adjustment portion 543, it is possible to adjust the optical path length difference between the first arm core 510 and the second arm core 520. The optical path length difference is set in accordance with the wavelength produced by the wavelength filter portion 550.

A width W7 of the first adjustment portion 535 and the width W8 of the second adjustment portion 543 are set such that the propagation constant of the TE polarized waves of the first-order mode matches the propagation constant of the TM polarized waves of the fundamental mode. As a result, optical path length differences that occur between the first adjustment portion 535 and the second adjustment portion 543 match each other for the TE polarized waves of the first-order mode and the TM polarized waves of the fundamental mode Here, the inventors performed a simulation to determine a preferable design example of the first adjustment portion 535 and the second adjustment portion 543. Here, the preferable design example was obtained for light having a wavelength of 1.55 µm. Further, a case was assumed in which the first adjustment portion 535 and the second adjustment portion 543 were made of Si and had a thickness of 0.22 µm, and the lower portion cladding layer 20 and the upper portion cladding layer 30 were made of $SiO_2$.

First, an equivalent refractive index of the TE polarized waves of the first-order mode and an equivalent refractive index of the TM polarized waves of the fundamental mode with respect to the width W7 of the first adjustment portion 535 and the width W8 of the second adjustment portion 543 were verified using FEM. The results are shown in FIG. 6.

Figure 6:
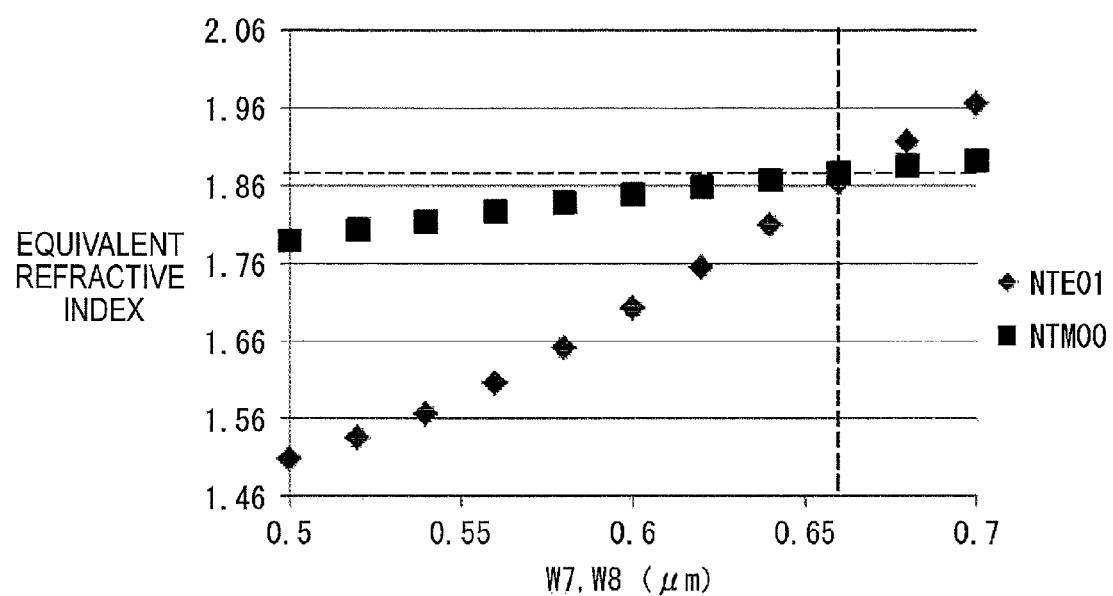
FIG. 6 is a diagram illustrating a simulation to determine an appropriate design example of a first adjustment portion and a second adjustment portion.

FIG. 6 is a diagram showing relationships of the equivalent refractive indices and the width W7 of the first adjustment portion 535 and the width W8 of the second adjustment portion 543. In FIG. 6, a vertical axis shows the equivalent refractive index in a desired unit and a horizontal axis shows the width W7 of the first adjustment portion 535 and the width W8 of the second adjustment portion 543 in units of nm. Further, the equivalent refractive index of the TE polarized waves of the first-order mode is shown by black diamonds and the equivalent refractive index of the TM polarized waves of the fundamental mode is shown by black squares.

As shown in FIG. 6, when the width W7 of the first adjustment portion 535 and the width W8 of the second adjustment portion 543 are set to 0.665 µm, the equivalent refractive index of the TE polarized waves of the first-order mode and the equivalent refractive index of the TM polarized waves of the fundamental mode match each other (namely, the propagation constants match each other). Thus, by setting the width W7 of the first adjustment portion 535 and the width W8 of the second adjustment portion 543 to 0.665 µm, it is possible to set the optical path length differences between the first arm core 510 and the second arm core 520 to be substantially equal for the TE polarized waves of the first-order mode and the TM polarized waves of the fundamental mode. In other words, it is possible to impart a polarization-independent optical path length difference by the first adjustment portion 535 and the second adjustment portion 543.

As described above, the first wavelength filter 300 can be used as a polarization-independent wavelength filter, by using the directional coupler 100 (the first directional coupler 110 and the second directional coupler 120). Further, the order modes of the TE polarized waves and the TM polarized waves coupled by the first directional coupler 110 and the second directional coupler 120 can be selected as desired at the design stage. Then, it is possible to optimize each of the structural elements of the first wavelength filter 300 in accordance with the selected order mode. Thus, the degree of freedom of design of the first wavelength filter 300 with respect to the thickness of the optical wavelength core is increased.

(Modified Example of First Wavelength Filter)

Figure 7:
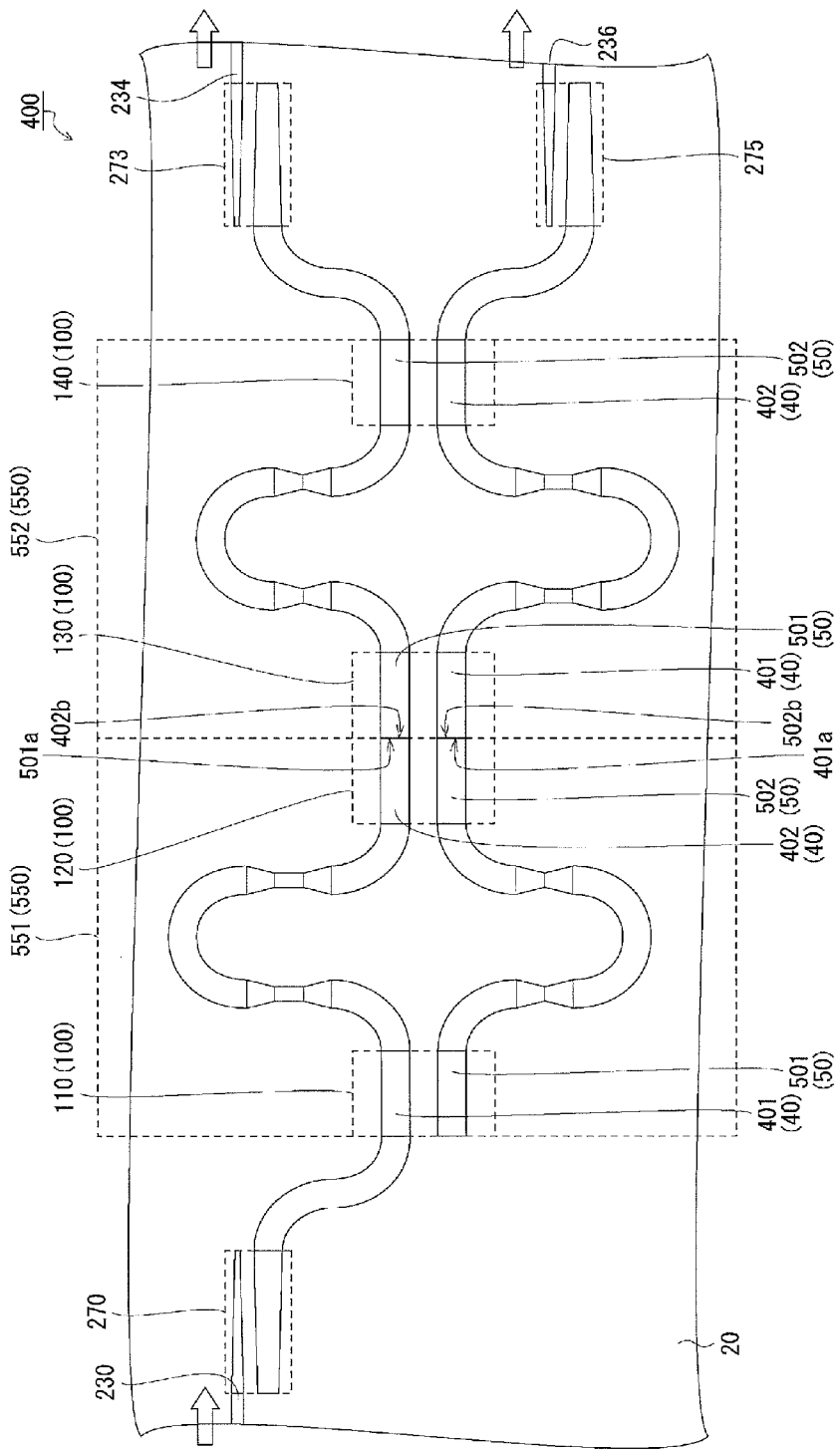
FIG. 7 is a schematic plan view showing a modified example of the first wavelength filter.

As a modified example of the first wavelength filter, a plurality of the above-described wavelength filter portions 550 can be provided. A wavelength filter according to this modified example will be explained with reference to FIG. 7. FIG. 7 is a schematic plan view showing the wavelength filter according to the modified example. Note that, in FIG. 7, the upper portion cladding layer 30 is omitted. Further, the same reference numerals are assigned to structural elements that are common to the first wavelength filter 300 and an explanation thereof is omitted here.

A wavelength filter 400 according to the modified example is provided with the plurality of wavelength filter portions 550 that are connected in series. In FIG. 7, a configuration example is shown in which two of the wavelength filter portions 550 (a first wavelength filter portion 551 and a second wavelength filter portion 552) are provided.

In the adjacent wavelength filter portions, the output terminal 402b of the first optical waveguide core 402 in the second directional coupler 120 of the first wavelength filter portion 551 is connected to the input terminal 501a of the second optical waveguide core 501 of a first directional coupler 130 of the second wavelength filter portion 552. Further, the output terminal 502b of the second optical waveguide core 502 in the second directional coupler 120 of the first wavelength filter portion 551 is connected to the input terminal 401a of the first optical waveguide core 401 in the first directional coupler 130 of the second wavelength filter portion 552.

In the wavelength filter 400 according to the modified example, a plurality of the wavelength filter portions 550 are provided and thus, it is possible to extract an optical signal in which transmission characteristics are flat, with respect to the set wavelength.

The inventors performed a simulation to evaluate characteristics of the wavelength filter 400 according to the configuration example shown in FIG. 7. In the simulation, the following conditions were set. A design was adopted in which an optical signal that includes the TE polarized waves and the TM polarized waves of the fundamental mode is input into the input port portion 230, and optical signals that include the TE polarized waves and the TM polarized waves of the fundamental mode having a center wavelength of 1.55 nm are output from the first output port portion 234 and the second output port portion 236 in a polarization-independent manner. Further, in the first directional coupler 110 and the second directional coupler 120, a configuration was set in which the first-order mode with respect to the TE polarized waves and the fundamental mode with respect to the TM polarized waves were respectively coupled. Further, each of the waveguide cores were made of Si and had a thickness of 0.22 μm, and the lower portion cladding layer 20 and the upper portion cladding layer 30 were made of $SiO_2$. Then, an intensity of the optical signals output from the first output port portion 234 and the second output port portion 236 were verified based on the transfer function that were mode-analyzed using FEM. Note that, here, coupling losses in the mode conversion areas 270, 273 and 275 were ignored.

Figure 8:
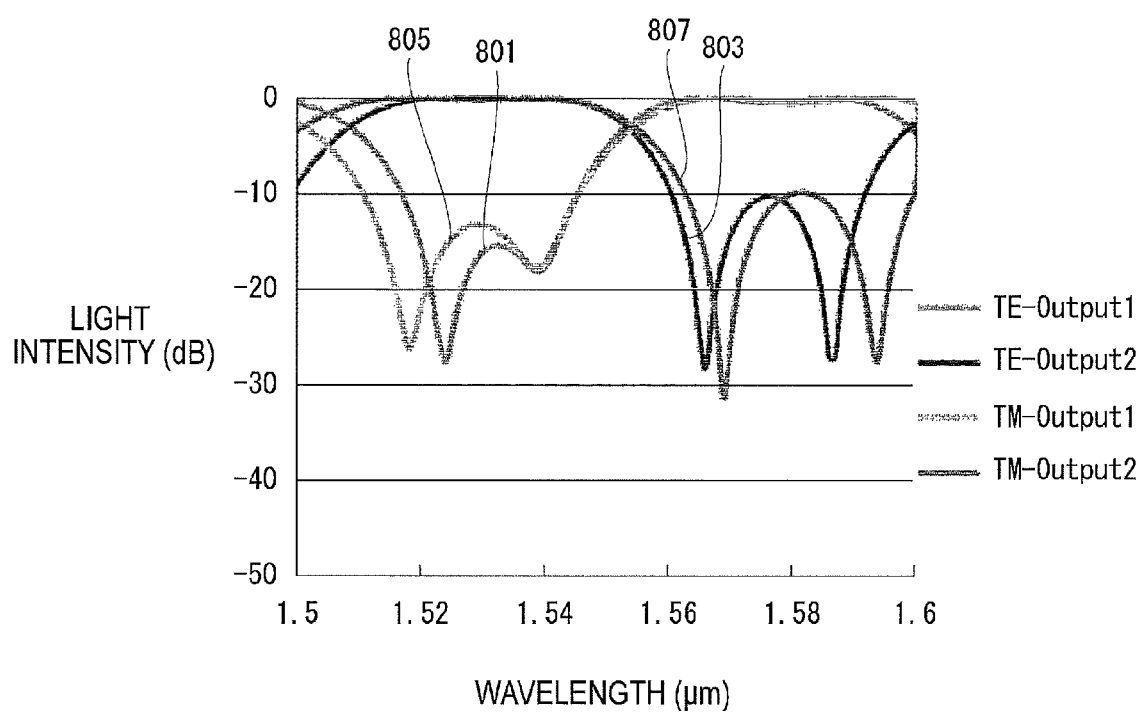
FIG. 8 is a diagram evaluating characteristics of the modified example of the first wavelength filter.

The results are shown in FIG. 8. FIG. 8 is a diagram showing the results of the simulation. In FIG. 8, a vertical axis shows optical intensity on a dB scale, and a horizontal axis shows the wavelength in units of nm. Further, a curved line 801 shows the optical intensity of the TE polarized waves output from the first output port portion 234 and a curved line 803 shows the optical intensity of the TE polarized waves output from the second output port portion 236. Further, a curved line 805 shows the optical intensity of the TM polarized waves output from the first output port portion 234 and a curved line 807 shows the optical intensity of the TM polarized waves output from the second output port portion 236.

As shown in FIG. 8, the intensity properties of TE polarized waves and TM polarized waves output from the first output port portion 234 match each other over the wide wavelength range centered at wavelength of 1.55 nm. At the same time, the intensity properties of TE polarized waves and TM polarized waves output from the second output port portion 236 match each other over the wide wavelength range centered at wavelength of 1.55 nm. From these results, it was verified that the wavelength filter 400 can be used as the polarization-independent wavelength filter.

(Second wavelength filter)

Figure 9:
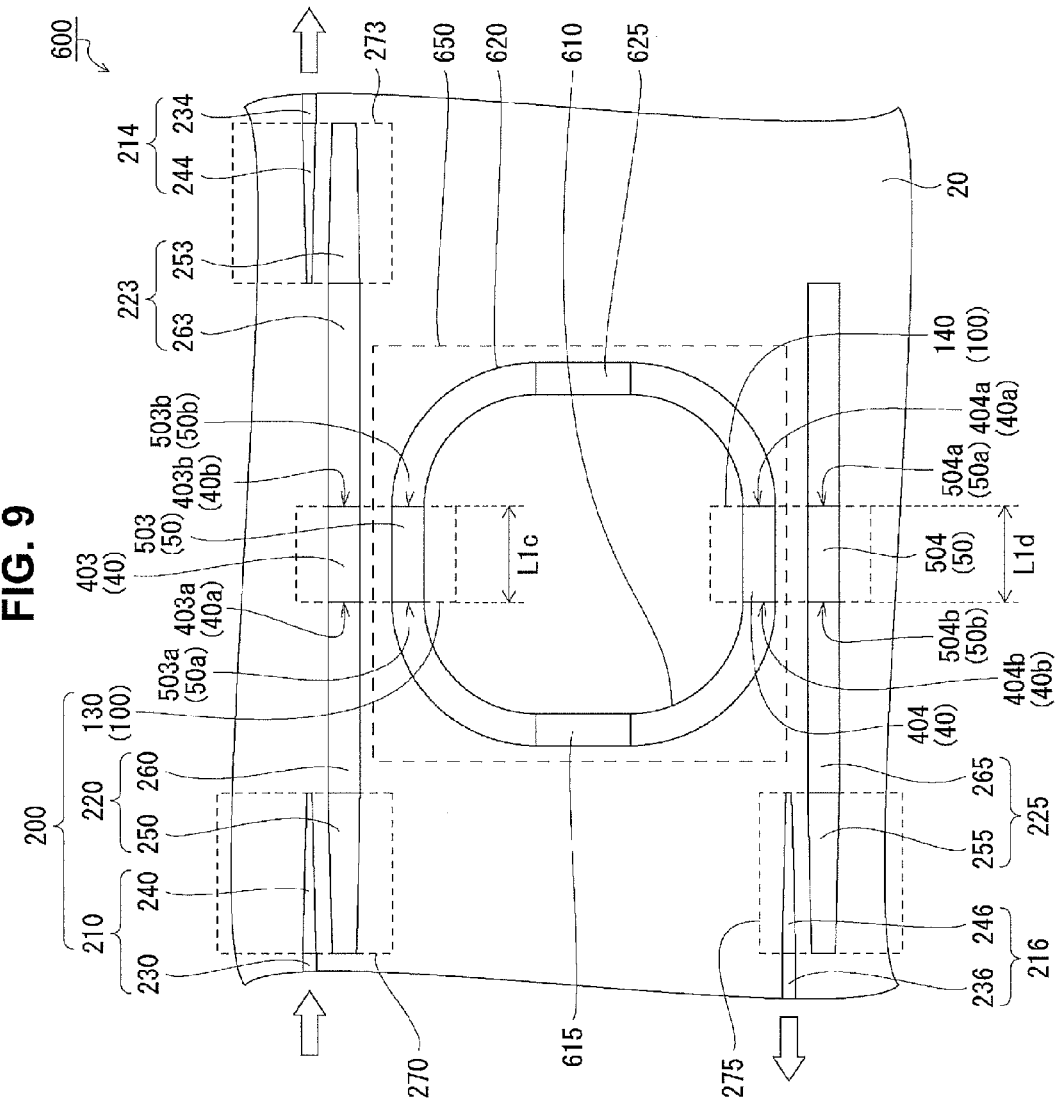
FIG. 9 is a schematic plan view showing a second wavelength filter.

A second wavelength filter that uses the above-described directional coupler 100 will be explained with reference to FIG. 9. FIG. 9 is a schematic plan view showing the second wavelength filter. Note that, in FIG. 9, the upper portion cladding layer 30 is omitted. Further, the same reference numerals are assigned to structural elements that are common to the directional coupler 100, the optical waveguide element 200 and the first wavelength filter 300 (refer to FIG. 5), and an explanation thereof is omitted here.

A second wavelength filter 600 is a ring resonator that uses the above-described directional coupler 100 as a coupler.

The second wavelength filter 600 is provided with two of the similarly designed directional couplers 100 (the first directional coupler 130 and a second directional coupler 140) and a pair of similarly designed arm cores (a first arm core 610 and a second arm core 620) that are provided between the first directional coupler 130 and the second directional coupler 140. The first arm core 610 and the second arm core 620 are formed on the lower portion cladding layer 20 and are made of the same material and have the same thickness as the first optical waveguide core 40 and the second optical waveguide core 50 of the directional coupler 100.

A first optical waveguide core 403 and a second optical waveguide core 503 that are provided on the first directional coupler 130, and a first optical waveguide core 404 and a second optical waveguide core 504 that are provided on the second directional coupler 140 are provided such that they are separated from each other and are arranged in parallel in that order.

The first arm core 610 forms a connection between one end 503a of the second optical waveguide core 503 provided on the first directional coupler 130 and another end 404b of the first optical waveguide core 404 provided on the second directional coupler 140. Further, the second arm core 620 forms a connection between another end 503b of the second optical waveguide core 503 provided on the first directional coupler 130 and one end 404a of the first optical waveguide core 404 provided on the second directional coupler 140. Thus, the second optical waveguide core 503 of the first directional coupler 130, the first arm core 610, the first optical waveguide core 404 of the second directional coupler 140 and the second arm core 620 are connected in order in a ring. Then, a ring waveguide core 650 is configured by the second optical waveguide core 503, the first arm core 610, the first optical waveguide core 404 and the second arm core 620.

In addition, the second wavelength filter 600 is provided with the first sub-waveguide core 210 and the second sub-waveguide core 220. Then, the above-described optical waveguide element 200 is configured by the first sub-waveguide core 210 and the second sub waveguide core 220, and the first directional coupler 130.

Furthermore, the third sub-waveguide core 223 is connected to another end 403b of the first optical waveguide core 403 of the first directional coupler 130. Further, the fourth sub-waveguide core 214 is provided such that it is arranged to be separated from and aligned with the third sub-waveguide core 223. The third sub-waveguide core 223 is formed to have the same design as the second sub-waveguide core 220. Further, the fourth sub-waveguide core 214 is formed to have the same design as the first sub-waveguide core 210. Then, the third sub-waveguide core 223 and the fourth sub-waveguide core 214 are provided in an arrangement relationship that is the same as that of the second sub waveguide core 220 and the first sub-waveguide core 210.

In addition, the fifth sub-waveguide core 225 is connected to another end 504b of the second optical waveguide core 504 of the second directional coupler 140. Further, the sixth sub-waveguide core 216 is provided such that it is arranged to be separated from and aligned with the fifth sub-waveguide core 225. The fifth sub-waveguide core 225 is formed to have the same design as the second sub-waveguide core 220. Further, the sixth sub-waveguide core 216 is formed to have the same design as the first sub-waveguide core 210. Then, the fifth sub-waveguide core 225 and the sixth sub-waveguide core 216 are provided in an arrangement relationship that is the same as that of the second sub-waveguide core 220 and the first sub-waveguide core 210.

The second wavelength filter 600 is used, for example, as a band-pass filter that produces an optical signal of a specific center wavelength. Here, as an example, a configuration example is explained in which an optical signal of the fundamental mode is input from the port portion (the input port portion) 230 and optical signals of the fundamental mode are respectively output from the port portion (the first output port portion) 234 and the port portion (the second output port portion) 236. It should be noted that, here, the first directional coupler 130 and the second directional coupler 140 are configured to respectively couple the first-order mode with respect to the TE polarized waves and the fundamental mode with respect to the TM polarized waves.

In this example, the optical signal that includes the TE polarized waves and the TM polarized waves of the fundamental mode is input into the input port portion 230. The TE polarized waves of the fundamental mode are converted to TE polarized waves of the first-order mode in the mode conversion area 270. Further, the TM polarized waves of the fundamental mode are not mode-converted in the mode conversion area 270 and the fundamental mode is maintained.

The optical signal that includes the TE polarized waves of the first-order mode and the TM polarized waves of the fundamental mode passes through the connection portion 260 and is input into the first optical waveguide core 403 of the first directional coupler 130. The optical signal is coupled between the first optical waveguide core 401 of the first directional coupler 130 and the ring waveguide core 650. In addition, the optical signal is coupled between the ring waveguide core 650 and the second optical waveguide core 504 of the second directional coupler 140. Then, the optical signal of a wavelength that resonates with the ring waveguide core 650 is divided and input into the connection portion 263 of the third sub-waveguide core 223 and the connection portion 265 of the fifth sub-waveguide core 225. Here, the branching ratio corresponds to a coupling length L1c of the first optical waveguide core 403 and the second optical waveguide core 503 of the first directional coupler 130 and a coupling length L1d of the first optical waveguide core 404 and the second optical waveguide core 504 of the second directional coupler 140. The optical signals input into the connection portion 263 and the connection portion 265 respectively include the TE polarized waves of the first-order mode and the TM polarized waves of the fundamental mode.

The TE polarized waves of the first-order mode input into the connection portion 263 are converted to TE polarized waves of the fundamental mode in the mode conversion area 273. The TM polarized waves of the fundamental mode are not mode-converted in the mode conversion area 273 and the fundamental mode is maintained. The optical signal that includes the TE polarized waves and the TM polarized waves of the fundamental mode is output from the first output port portion 234. Meanwhile, the TE polarized waves of the first-order mode input into the connection portion 265 are converted to TE polarized waves of the fundamental mode in the mode conversion area 275. Further, the TM polarized waves of the fundamental mode included in the optical signal are not mode-converted in the mode conversion area 275 and the fundamental mode is maintained. The optical signal that includes the TE polarized waves and the TM polarized waves of the fundamental mode is output from the second output port portion 236.

Note that designs of the mode conversion areas 270, 273 and 275 are optimized in accordance with a wavelength that is to be produced by the second wavelength filter 600.

A configuration example of the first arm core 610 and the second arm core 620 will be explained.

The first arm core 610 and the second arm core 620 are configured by the curved waveguide cores having the same radius of curvature as each other. Then, the first arm core 610 and the second arm core 620 propagate the TE polarized waves of the first-order mode and the TM polarized waves of the fundamental mode.

A first phase compensation portion 615 is formed part way along the first arm core 610. Further a second phase compensation portion 625 is formed part way along the second arm core 620.

The first phase compensation portion 615 and the second phase compensation portion 625 are configured by linear waveguide cores. The phase compensation portions 615 and 625 compensate for inconsistencies between a phase difference imparted to the TE polarized waves of the first-order mode and a phase difference imparted to the TM polarized waves of the fundamental mode in each of the arm cores 610 and 620.

A radius of curvature R of the first arm core 610 and the second arm core 620 and a phase difference $\phi_{TE1}$ imparted to the TE polarized waves of the first-order mode in the curved section of each of the arm cores 610 and 620 are expressed by Formula 13 below. A phase difference $\phi_{TM0}$ imparted to the TM polarized waves of the fundamental mode is expressed by Formula 14 below.

[Formula 13] and [Formula 14]

$$\phi_{TE1} = \pi R \beta_{TE1} \tag{13}$$

$$\phi_{TM0} = \pi R \beta_{TM0} \tag{14}$$

Note that $\beta_{TE1}$ indicates the propagation constant of the TE polarized waves of the first-order mode in the curved section of each of the arm cores 610 and 620. Further, $\beta_{TM0}$ indicates the propagation constant of the TM polarized waves of the fundamental mode in the curved section of each of the arm cores 610 and 620. An amount of displacement $\Delta\phi$ between the phase differences imparted to the TE polarized waves of the first-order mode and the TM polarized waves of the fundamental mode is $\Delta\phi = \pi R (\beta_{TE1} - \beta_{TM0})$.

Meanwhile, when a length of the first phase compensation portion 615 and the second phase compensation portion 625 is L, a phase difference $\phi'_{TE1}$ that is imparted to the TE polarized waves of the first-order mode in each of the phase compensation portions 615 and 625 is expressed by Formula 15 below. Further, a phase difference $\phi'_{TM0}$ that is imparted to the TM polarized waves of the fundamental mode is expressed by Formula 16 below.

[Formula 15] and [Formula 16]

$$\phi'_{TE1} = L\beta'_{TE1} \tag{15}$$

$$\phi'_{TE0} = L\beta'_{TE0} \tag{16}$$

It should be noted that $\beta'_{TE1}$ indicates the propagation constant of the TE polarized waves of the first-order mode of each of the phase compensation portions 615 and 625. Further, $\beta'_{TM0}$ indicates the propagation constant of the TM polarized waves of the fundamental mode of each of the phase compensation portions 615 and 625. An amount of displacement $\Delta\phi'$ between the phase differences imparted to the TE polarized waves of the first-order mode and the TM polarized waves of the fundamental mode in each of the phase compensation portions 615 and 625 is $\Delta\phi'=L$ ($\beta'_{TE1}-\beta'_{TM0}$).

In order to compensate for the amount of displacement $\Delta\phi$ of the phase differences in the curved sections of each of the arm cores 610 and 620, it is sufficient if the length L of each of the phase compensation portions 615 and 625 is designed such that $\Delta\phi+\Delta\phi'=0$. Thus, by designing the length L of each of the phase compensation portions 615 and 625 such that Formula 17 below is satisfied, it is possible to compensate for the amount of displacement $\Delta\phi$ of the phase differences in each of the arm cores 610 and 620.

[Formula 17]

$$L = \frac{-\pi R(\beta_{TE1} - \beta_{TM0})}{\beta'_{TE1} - \beta'_{TM0}} \quad (17)$$

By providing the first phase compensation portion 615 and the second phase compensation portion 625 designed in this manner, it is possible to match central oscillation wavelengths of the ring waveguide core 650 in the TE polarized waves of the first-order mode and the TM polarized waves of the fundamental mode. Thus, an optical signal of a wavelength that resonates with the ring waveguide core 650 can be input into the connection portion 263 and the connection portion 265 in a polarization-independent manner.

As described above, by using the directional coupler 100 (the first directional coupler 130 and the second directional coupler 140), the second wavelength filter 600 can be used as a polarization-independent wavelength filter. Further, the order modes of the TE polarized waves and the TM polarized waves that are coupled by the first directional coupler 130 and the second directional coupler 140 can be selected as desired at the design stage. Then, depending on the order modes, it is possible to optimize each of the structural elements of the second wavelength filter 600. Thus, the degree of freedom of design with respect to the thickness of the optical waveguide core is increased in the second wavelength filter 600.

(Third wavelength filter)

Figure 10:
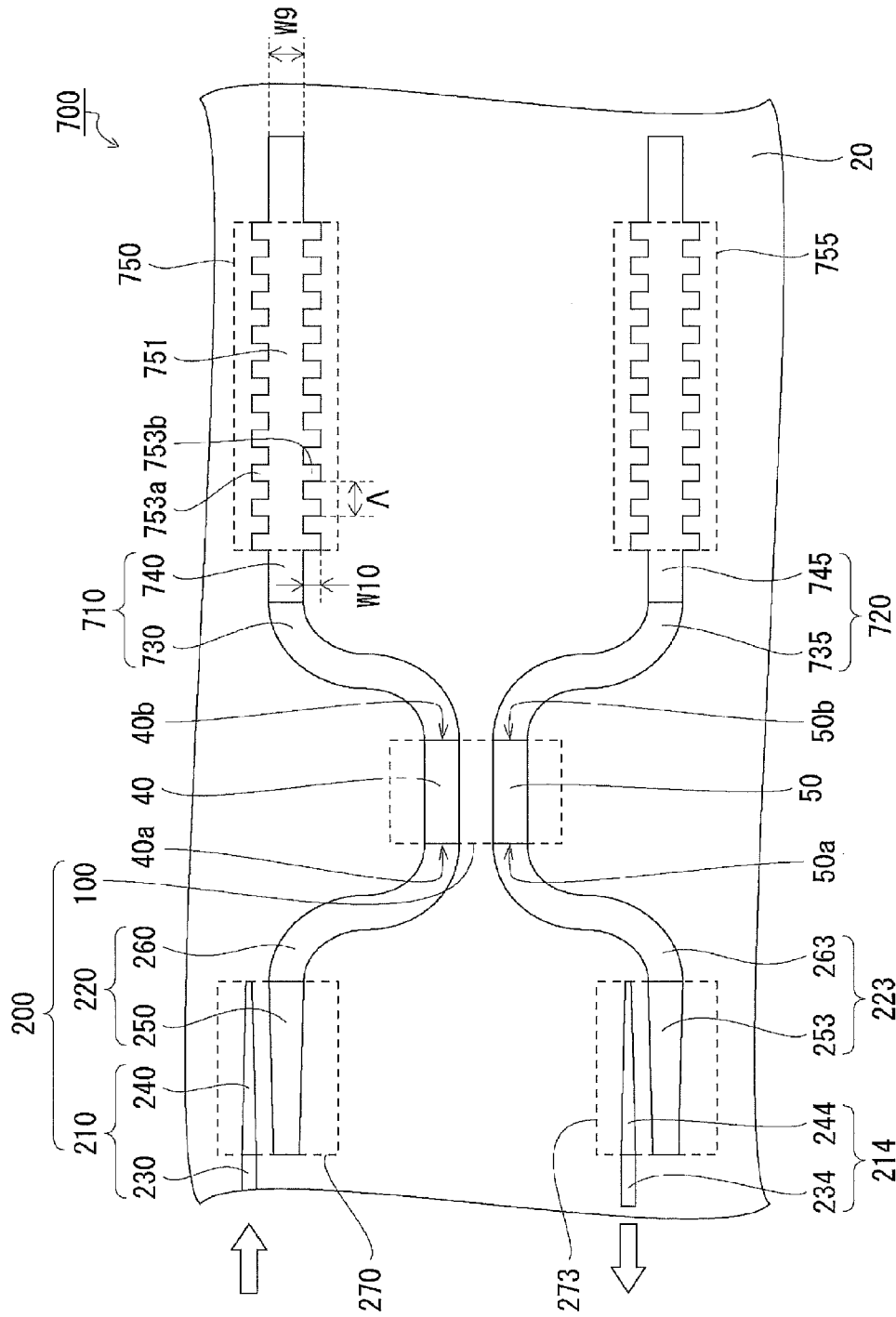
FIG. 10 is a schematic plan view showing a third wavelength filter.

A third wavelength filter that uses the above-described directional coupler 100 will be explained with reference to FIG. 10. FIG. 10 is a schematic plan view showing the third wavelength filter. Note that, in FIG. 10, the upper portion cladding layer 30 is omitted. Further, the same reference numerals are assigned to structural elements that are common to the directional coupler 100, the optical waveguide element 200, the first wavelength filter 300 (refer to FIG. 5) and the second wavelength filter 600 (refer to FIG. 9), and an explanation thereof is omitted here.

A third wavelength filter 700 is a grating type wavelength filter that uses the above-described directional coupler 100 as a coupler.

The third wavelength filter 700 is provided with the directional coupler 100 and a pair of similarly designed arm cores (a first arm core 710 and a second arm core 720) that are connected to the directional coupler 100. The first arm core 710 and the second arm core 720 are formed on the lower portion cladding layer 20 and are made of the same material and have the same thickness as the first optical waveguide core 40 and the second optical waveguide core 50 in the directional coupler 100.

The first arm core 710 is connected to the other end 40b of the first optical waveguide core 40 provided on the directional coupler 100. Further, the second arm core 720 is connected to the other end 50b of the second optical waveguide core 50 provided on the directional coupler 100. Gratings 750 and 755, which reflect light of a specific wavelength, are formed on the first arm core 710 and the second arm core 720, respectively.

In addition, the third wavelength filter 700 is provided with the first sub-waveguide core 210 and the second sub waveguide core 220. Then, the above-described optical waveguide element 200 is configured by the first sub-waveguide core 210 and the second sub waveguide core 220, and the directional coupler 100.

Additionally, the third sub-waveguide core 223 is connected to the one end 50a of the second optical waveguide core 50 of the directional coupler 100. Further, the fourth sub-waveguide core 214 is provided such that it is arranged to be separated from and aligned with the third sub-waveguide core 223. The third sub-waveguide core 223 is formed to have the same design as the second sub-waveguide core 220. Further, the fourth sub-waveguide core 214 is formed to have the same design as the first sub-waveguide core 210. Then, the third sub-waveguide core 223 and the fourth sub-waveguide core 214 are provided in an arrangement relationship that is the same as that of the second sub waveguide core 220 and the first sub-waveguide core 210.

The third wavelength filter 700 is used, for example, as a band-pass filter that produces an optical signal of a specific center wavelength. Here, as an example, a configuration example is explained in which an optical signal of the fundamental mode is input from the port portion (the input port portion) 230 and the optical signal of the fundamental mode is output from the port portion (the output port portion) 234. It should be noted that, here, the directional coupler 100 is configured to respectively couple the first-order mode with respect to the TE polarized waves and the fundamental mode with respect to the TM polarized waves.

In this example, the optical signal that includes the TE polarized waves and the TM polarized waves of the fundamental mode is input into the input port portion 230. The TE polarized waves of the fundamental mode is converted to TE polarized waves of the first-order mode in the mode conversion area 270. Further, the TM polarized waves of the fundamental mode are not mode-converted in the mode conversion area 270 and the fundamental mode is maintained.

The optical signal that includes the TE polarized waves of the first-order mode and the TM polarized waves of the fundamental mode passes through the connection portion 260 and is input into the first optical waveguide core 40 of the directional coupler 100. In the directional coupler 100, the optical signal is divided at a branching ratio that is dependent on the coupling length of the first optical waveguide core 40 and the second optical waveguide core 50. The divided optical signals respectively include the TE polarized waves of the first-order mode and the TM polarized waves of the fundamental mode. The divided optical signals are respectively input into the first arm core 710 and the second arm core 720.

The optical signal that is propagated through the first arm core 710 is reflected by the grating 750. The reflected optical signal is input into the first optical waveguide core 40 of the directional coupler 100. In addition, the optical signal that is propagated through the second arm core 720 is reflected by the grating 755. The reflected optical signal is input into the second optical waveguide core 50 of the directional coupler 100. It should be noted that, in the grating 750 and the grating 755, the optical signals of the wavelengths depending on the design of the gratings 750 and 755 are reflected. Then, the optical signal input from the first arm core 710 and the optical signal input from the second arm core 720 are multiplexed in the directional coupler 100. The TE polarized waves of the first-order mode and the TM polarized waves of the fundamental mode are respectively included in the multiplexed optical signal.

The multiplexed optical signal is input into the connection portion 263. Then, the TE polarized waves of the first-order mode that are included in the optical signal is converted to TE polarized waves of the fundamental mode in the mode conversion area 273. Further, the TM polarized waves of the fundamental mode that are included in the optical signal are not mode-converted in the mode conversion area 273 and the fundamental mode is maintained. An optical signal that includes the TE polarized waves and the TM polarized waves of the fundamental mode is output from the output port portion 234.

Note that designs of the mode conversion areas 270 and 273 are optimized in accordance with a wavelength that is to be produced by the third wavelength filter 700.

A configuration example of the first arm core 710 and the second arm core 720 will be explained.

The first arm core 710 is configured such that a connection portion 730 and a Bragg reflector portion 740 are connected. The grating 750 is formed on the Bragg reflector portion 740. Further, the second arm core 720 is configured such that a connection portion 735 and a Bragg reflector portion 745 are connected. The grating 755 is formed on the Bragg reflector portion 745. Then, the first arm core 710 and the second arm core 720 propagate the TE polarized waves of the first-order mode and the TM polarized waves of the fundamental mode.

In the present embodiment, phase difference of optical signal between output from the end 40b of the first optical waveguide core 40 and the other end 50b of the second optical waveguide core 50 is 90-degree. By adjusting a length of the connection portions 730 and 735, optical signals reflected by the gratings 750 and 755 are multiplexed in the directional coupler 100 and interfere constructively to be output from the one end 50a of the second optical waveguide core 50.

The grating 750 is configured to integrally include a base portion 751 and protruding portions 753a and 753b. The base portion 751 is formed at a constant width and extends along the direction of propagation of the light. A plurality of the protruding portions 753a is formed periodically on one side surface of the base portion 751. A plurality of the protruding portions 753b is provided on the other side of the base portion 751 at the same period as the protruding portions 753a. The protruding portions 753a and 753b are formed in positions symmetrical to each other on either side of the base portion 751.

The grating 750 performs Bragg reflection of the same wavelength of the TE polarized waves of the first-order mode and the TM polarized waves of the fundamental mode. Bragg reflection conditions of the grating 750 are expressed by Formula 18 below.

[Formula 18]

$$2\Lambda N = \lambda_b \quad (18)$$

It should be noted that N indicates an equivalent refractive index of incipient light and reflected light that are coupled by the grating. Further, Λ indicates the grating period. Then, in the grating 750, a wavelength $\lambda_b$ at which the above Formula 18 is completed, namely, light of the Bragg wavelength, is reflected. The equivalent refractive index N is wavelength-dependent and therefore, Formula 18 is only completed with respect to the specific wavelength $\lambda_b$.

Then, in order to set the same wavelength of the Bragg wavelength for the TE polarized waves of the first-order mode and the TM polarized waves of the fundamental mode, it is sufficient to cause the equivalent refractive index N of the above Formula 18 to match for the TE polarized waves of the first-order mode and the TM polarized waves of the fundamental mode. When, with respect to an equivalent refractive index $N_{TE1}$ of the TE polarized waves of the first-order mode and an equivalent refractive index $N_{TM0}$ of the TM polarized waves of the fundamental mode, $N_{TE1}=N_{TM0}$ is completed, it is possible to reflect the same wavelength of the TE polarized waves of the first-order mode and the TM polarized waves of the fundamental mode. Therefore, a width W9 of the base portion 751, a protruding width W10 of the protruding portions 753a and 753b and the period Λ of the protruding portions 753a and 753b are designed such that $N_{TE1}=N_{TM0}$ is completed.

Note that the grating 755 is formed in the same design as the grating 750. By designing the gratings 750 and 755 in this way, it is possible to reflect the optical signals of the same wavelength in a polarization-independent manner.

The inventors performed a simulation to evaluate the characteristics of the gratings 750 and 755 designed in the above-described manner. In the simulation, the three-dimensional finite-difference time-domain (FDTD) method was used to evaluate the characteristics. In this simulation, the TE polarized waves of the first-order mode and the TM polarized waves of the fundamental mode were input to the gratings 750 and 755 and respective intensities of the TE polarized waves of the first-order mode and the TM polarized waves of the fundamental mode reflected by the gratings 750 and 755 were observed.

Here, the Bragg reflector portions 740 and 745 that form the gratings 750 and 755 were made of Si and had a thickness of 0.22 μm, and the lower portion cladding layer 20 and the upper portion cladding layer 30 were made of $SiO_2$. Then, the width W9 of the base portion 751, the protruding width W10 of the protruding portions 753a and 753b and the period Λ of the protruding portions 753a and 753b were set such that the above-described $N_{TE1}=N_{TM0}$ was completed at the Bragg wavelength of 1.55 μm.

The results are shown in FIG. 11. FIG. 11 is a diagram showing the results of the simulation. In FIG. 11, a vertical axis shows optical intensity on a dB scale, and a horizontal axis shows the wavelength in units of nm. Further, the optical intensity of the TE polarized waves of the first-order mode that are reflected by the grating is shown by a curved line 11 and the optical intensity of the TM polarized waves of the fundamental mode that are reflected by the grating is shown by a curved line 12.

As shown in FIG. 11, the optical intensity of both the TE polarized waves of the first-order mode and the TM polarized waves of the fundamental mode was maximum at the set Bragg wavelength of 1.55 μm. Thus, from these results, it was verified that it is possible to reflect the optical signals in a polarization-independent manner using the gratings 750 and 755. Note that it is conceivable that the intensity of each of the polarizations can be matched at an even higher intensity by setting the length of the gratings to be longer.

As described above, by using the directional coupler 100, the third wavelength filter 700 can be used as a polarization-independent wavelength filter. Further, the order modes of the TE polarized waves and the TM polarized waves that are coupled by the directional coupler 100 can be selected as desired at the design stage. In addition, it is possible to optimize each of the structural elements of the third wavelength filter 700 in accordance with the selected order modes. Thus, the degree of freedom of design of the third wavelength filter 700 with respect to the thickness of the optical wavelength core is increased.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An optical waveguide element comprising:
a directional coupler comprising a first optical waveguide core and a second optical waveguide core that are arranged in parallel to each other and that propagate either TE polarized waves or TM polarized waves of an m-th order (m is an integer of 1 or more) and propagate the orthogonally polarized waves of an n-th order (n is an integer of 0 or more);
a first sub-waveguide core that includes a first converter; and
a second sub waveguide core that includes a second converter and that is connected to the first optical waveguide core;
wherein a separation distance between the first optical waveguide core and the second optical waveguide core and a width of the first optical waveguide core and the second optical waveguide core are set such that a mode coupling coefficient of a p-th mode of one of the polarized waves (p is an integer satisfying $0 \leq p \leq m$) and a mode coupling coefficient of a q-th mode of the other polarized waves (q is an integer satisfying $0 \leq q \leq n$) match between the first optical waveguide core and the second optical waveguide core,
wherein a mode conversion area is provided in which the first converter and the second converter are arranged alongside each other, and
wherein one of the polarized waves of an i-th mode (i is an integer of 0 or more) that are propagated through the first converter and the identically polarized waves of the p-th mode that are propagated through the second converter are coupled in the mode conversion area, and the other polarized waves of a j-th mode (j is an integer of 0 or more) that are propagated through the first converter and the identically polarized waves of the q-th mode that are propagated through the second converter are coupled in the mode conversion area.

2. The directional coupler according to claim 1, wherein at least one of the p-th mode and the q-th mode is a higher-order mode.

3. A wavelength filter comprising:
a wavelength portion that includes two directional couplers, each directional coupler comprising a first optical waveguide core and a second optical waveguide core that are arranged in parallel to each other and that propagate either TE polarized waves or TM polarized waves of an m-th order (m is in integer of 1 or more) and propagate the orthogonally polarized waves of an n-th order (n is an integer of 0 or more);
a first sub-waveguide core that includes a first converter;
a second sub waveguide core that includes a second converter and that is connected to the first optical waveguide core;
a first arm core; and
a second arm core;
wherein, a separation distance between the first optical waveguide core and the second optical waveguide core and a width of the first optical waveguide core and the second optical waveguide core are set such that a mode coupling coefficient of a p-th mode of one of the polarized waves (p is an integer satisfying $0 \leq p \leq m$) and a mode coupling coefficient of a q-th mode of the other polarized waves (q is an integer satisfying $0 \leq q \leq n$) match between the first optical waveguide core and the second optical waveguide core,
wherein a mode conversion area is provided in which the first converter and the second converter are arranged alongside each other,
wherein one of the polarized waves of an i-th mode (i is an integer of 0 or more) that are propagated through the first converter and the identically polarized waves of the p-th mode that are propagated through the second converter are coupled in the mode conversion area, and the other polarized waves of a j-th mode (j is an integer of 0 or more) that are propagated through the first converter and the identically polarized waves of the q-th mode that are propagated through the second converter are coupled in the mode conversion area,
the first arm core forms a connection between the first optical waveguide core provided in the one directional coupler and the first optical waveguide core provided in the other directional coupler,
the second arm core forms a connection between the second optical waveguide core provided in the one directional coupler and the second optical waveguide core provided in the other directional coupler, and
the first arm core and the second arm core have different optical path lengths.

4. An optical waveguide element comprising:
a directional coupler comprising a first optical waveguide core and a second optical waveguide core that are arranged in parallel to each other and that propagate either TE polarized waves or TM polarized waves of an m-th order (m is an integer of 1 or more) and propagate the orthogonally polarized waves of an n-th order (n is an integer of 0 or more);
a first sub-waveguide core that includes a first converter; and
a second sub waveguide core that includes a second converter and that is connected to the first optical waveguide core,
wherein a separation distance between the first optical waveguide core and the second optical waveguide core and a width of the first optical waveguide core and the second optical waveguide core are set such that a mode coupling coefficient of a p-th mode of one of the polarized waves (p is an integer satisfying $0 \leq p \leq m$) and a mode coupling coefficient of a q-th mode of the other polarized waves (q is an integer satisfying $0 \leq q \leq n$) match between the first optical waveguide core and the second optical waveguide core, at least one of the p-th mode and the q-th mode is a higher-order mode, a mode conversion area is provided in which the first converter and the second converter are arranged alongside each other, and one of the polarized waves of an i-th mode (i is an integer of 0 or more) that are propagated through the first converter and the identically polarized waves of the p-th mode that are propagated through the second converter are coupled in the mode conversion area, and the other polarized waves of a j-th mode (j is an integer of 0 or more) that are propagated through the first converter and the identically polarized waves of the q-th mode that are propagated through the second converter are coupled in the mode conversion area.

* * * * *